(12) United States Patent
Roumeliotis et al.

(10) Patent No.: US 12,385,944 B1
(45) Date of Patent: Aug. 12, 2025

(54) PLANE EXTRACTION AND LOCALIZATION

(71) Applicant: Apple Inc., Cupertino, CA (US)

(72) Inventors: Stergios Roumeliotis, Los Altos Hills, CA (US); Oleg Naroditsky, San Francisco, CA (US); Connie Wu, Menlo Park, CA (US); Daniel C. Byrnes, Redwood City, CA (US); Kuen-han Lin, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 210 days.

(21) Appl. No.: 17/200,962

(22) Filed: Mar. 15, 2021

Related U.S. Application Data

(60) Provisional application No. 62/990,698, filed on Mar. 17, 2020.

(51) Int. Cl.
  *G01P 15/18* (2013.01)
  *G01S 17/08* (2006.01)
  *G01S 17/89* (2020.01)

(52) U.S. Cl.
  CPC .............. *G01P 15/18* (2013.01); *G01S 17/08* (2013.01); *G01S 17/89* (2013.01)

(58) Field of Classification Search
  CPC . G06T 2207/10028; G06T 17/05; G06T 7/11; G06T 7/73; G01C 15/002; G01C 21/16; G01C 21/206; G01C 21/3848; G01C 21/367; G01S 17/08; G01S 17/89; G01S 17/894; G06V 10/235; G06V 10/426; G06V 10/44; G06V 10/457; G06V 10/46; G06V 10/50; G06V 10/757; G06V 20/10; G06V 20/56; G06V 2201/12; G01P 15/18; G05D 1/0212; G05D 1/0236; G05D 1/024
  See application file for complete search history.

(56) References Cited

U.S. PATENT DOCUMENTS

| | | | | |
|---|---|---|---|---|
| 8,521,418 B2 * | 8/2013 | Ma | ......................... | G01S 17/89 |
| | | | | 701/426 |
| 8,711,206 B2 * | 4/2014 | Newcombe | ............... | G06T 7/20 |
| | | | | 348/46 |
| 9,053,547 B2 * | 6/2015 | Kitamura | ................ | G01B 11/24 |
| 9,183,631 B2 * | 11/2015 | Taguchi | .................... | G06T 7/75 |
| 9,355,451 B2 * | 5/2016 | Oi | ......................... | G06F 3/0346 |

(Continued)

FOREIGN PATENT DOCUMENTS

WO  WO 2019236554  12/2019

*Primary Examiner* — Huy Q Phan
*Assistant Examiner* — Martin Walter Braunlich
(74) *Attorney, Agent, or Firm* — Thompson Hine LLP

(57) ABSTRACT

Various implementations disclosed herein include devices, systems, and methods that localize a device based on detecting planes in depth data acquired by the device. For example, an example process may include detecting first plane data in first sensor data acquired by a sensor at a first viewpoint location in a physical environment, detecting second plane data in second sensor data acquired by the sensor at a second viewpoint location in the physical environment, determining that the first plane data and the second plane data correspond to a same plane based on comparing the first plane data with the second plane data, and determining a spatial transformation between the first viewpoint location and the second viewpoint location based on the first plane data and the second plane data.

21 Claims, 9 Drawing Sheets

(56) References Cited

U.S. PATENT DOCUMENTS

| | | | |
|---|---|---|---|
| 9,412,040 B2 | 8/2016 | Feng et al. | |
| 10,410,328 B1 * | 9/2019 | Liu | G05D 1/0274 |
| 10,410,429 B2 | 9/2019 | Chen et al. | |
| 10,877,153 B2 * | 12/2020 | Barbier | G01S 17/10 |
| 11,120,629 B2 * | 9/2021 | Choi | G01P 15/18 |
| 11,282,228 B2 * | 3/2022 | Kashitani | H04N 17/002 |
| 2020/0011668 A1 | 1/2020 | Derhy et al. | |
| 2020/0043186 A1 * | 2/2020 | Selviah | G06T 7/33 |
| 2020/0333466 A1 * | 10/2020 | Hansen | G01S 17/08 |

\* cited by examiner

PLANE EXTRACTION AND LOCALIZATION

CROSS-REFERENCE TO RELATED APPLICATIONS

This Application claims the benefit of U.S. Provisional Application Ser. No. 62/990,698 filed Mar. 17, 2020, which is incorporated herein in its entirety.

TECHNICAL FIELD

The present disclosure generally relates to the field of mobile devices, and in particular, to systems, methods, and devices that detect and extract plane data and localize a mobile device.

BACKGROUND

The implementation of localization on a mobile device, such as a smartphone, allows a user and/or applications on the device to locate the device's position and/or assist with navigation within a physical environment, such as a building. Localization of a mobile device may be determined using sensors on the device (e.g., inertial measurement unit (IMU), gyroscope, etc.), WIFI localization, or other techniques (e.g., visual-inertial odometry (VIO) from image data). A global positioning system (GPS) system can also provide an approximate position of the mobile device, however, GPS is usually limited indoor due to the degradation of signals by the building structures. Additionally, existing techniques for localization of a device may be inefficient and require higher computation with increased power consumption using a mobile device, for example, based on a user acquiring photos or video or other sensor data while walking around a room. Moreover, existing techniques may fail to provide sufficiently accurate and efficient approximate localization in real time environments when there is a need for fast localization.

SUMMARY

Various implementations disclosed herein include devices, systems, and methods that provide localization for a moving mobile device based on information from detecting and extracting planes. This information may be used for providing corrections to the inertial measurement unit (IMU) integration within an estimation framework of the visual-inertial odometry (VIO) system of the device. It may be desirable to quickly and efficiently track a location of the moving device in a three-dimensional (3D) coordinate system for various reasons, e.g., during real time extended reality (XR) environments that include depictions of a physical environment including real physical objects and virtual content.

In many applications, (e.g., XR environments), the six degrees of freedom (DOF) for position and orientation (e.g., pose) of a mobile device is determined. For example, an IMU is used for measuring the device's rotational velocity and linear acceleration. In some implementations, the IMU's signals can be integrated in order to track a device's pose, but only for a limited period of time since the sensors' noise and bias will cause the estimates to diverge. To address the divergence problem, it may be desirable to include a camera in the process (e.g., often referred to as vision-aided inertial navigation). In some implementations, point features are extracted from each image and tracked across space and time in order to obtain additional information for the device's motion (e.g., rotation and translation information). In some instances, however, the scene in front of the camera may contain very few, if any, point features due to lack of texture (e.g., a blank wall). Thus, in an exemplary implementation, the IMU data may be corrected by detecting, extracting, and tracking planes from depth data (e.g., acquired from depth sensors, extrapolated from RGB data, etc.) and subsequently processing the plane tracks in order to provide periodic state corrections to the IMU data.

In some implementations, the plane detection and extraction process may involve obtaining a set of 3D points (e.g., sparse depth data) and classifying them into planes while estimating the planes' parameters. 3D point classification and plane-parameter estimation are computed in two successive steps, plane detection followed by plane extraction, of progressively increasing accuracy. In an exemplary implementation, plane detection is optimized for speed of classification, and plane extraction is focusing on precise plane-parameter estimation and outlier rejection (e.g., fine tuning).

Some implementations of this disclosure involve an exemplary method of localizing a device based on detecting planes in depth data acquired by the device. The exemplary method initially involves, at a device having a processor, detecting first plane data (e.g., one or more planes) in first sensor data acquired by a sensor at a first viewpoint location in a physical environment, and detecting second plane data in second sensor data acquired by the sensor at a second viewpoint location in the physical environment. For example, the first sensor data may be a grid of depth values acquired at a first point in time, and the second sensor data may be a grid of depth values acquired at a second point in time. Additionally, plane data may include 3D positions of depth points of the sensor data on a plane, a plane normal vector of the plane, and/or a distance of the plane from the viewpoint location.

The exemplary method further involves determining that the first plane data and the second plane data correspond to a same plane based on comparing the first plane data with the second plane data. For example, determining that the first plane data and the second plane data correspond to a same plane may be determined by comparing the plane data such as plane normal vectors and distance. In some implementations, for two frames, if multiple planes are detected in each frame, these planes can each be matched across the two frames. In some implementations, for multiple frames (e.g., more than two frames), if multiple planes are detected in each frame of the multiple frames, these planes can each be matched across each of the frames.

The exemplary method further involves determining a spatial transformation (e.g., motion or movement of the device such as determining the relative pose (position and orientation) of the device) between the first viewpoint location and the second viewpoint location based on the first plane data and the second plane data. For example, the plane normal vector and distance associated with the plane for each of the viewpoints may be used to determine motion constraints. In some implementations, the IMU data may be used to determine the motion of the sensor. For example, corrections to the IMU integration within the estimation framework of the VIO may be utilized with some of the implementations described herein.

In some implementations, determining the spatial transformation includes determining a motion constraint based on a first plane normal vector of the first plane data and second plane normal vector of the second plane data. In some implementations, determining the spatial transformation includes determining a second motion constraint based on a sensor-to-plane distance of the first plane data and a sensor-to-plane distance of the second plane data.

In some implementations, determining the spatial transformation includes determining motion constraints based on a first plane normal vector of the first plane data and second plane normal vector of the second plane data, a sensor-to-plane distance of the first plane data and a sensor-to-plane distance of the second plane data, and covariance data of plane normal vectors and sensor-to-plane distances. In some implementations, determining the spatial transformation includes determining a motion based on motion data from an IMU.

In some implementations, the first sensor data and second sensor data include grids of depth values acquired via a depth sensor. In some implementations, determining that the first plane data and the second plane data correspond to the same plane includes determining that a direction of the first plane normal vector and a direction of the second plane normal vector are within a vector direction threshold.

In some implementations, determining that the first plane data and the second plane data correspond to the same plane further includes determining a sensor-to plane distance in the first plane data and a sensor-to-plane distance in the second plane data are within a sensor-to-plane distance threshold.

In some implementations, the exemplary method further includes identifying multiple planes represented in the first sensor data and the second sensor data, and determining motion constraints based on the multiple planes, wherein determining the spatial transformation is based on the motion constraints.

Some implementations of this disclosure involve an exemplary method of identifying planes in depth data using a two-stage process that first, detects which of the depth points are likely planes, and second, selectively uses only those depth points that are likely planes to accurately and efficiently extract planes (e.g., identifying depth points on a plane, normal vector, distance, and covariance). The exemplary method first involves, at a device having a processor, receiving depth data (e.g., a densified depth image) acquired by a depth sensor in a physical environment, the depth data including points corresponding to distances of portions of the physical environment from the depth sensor. For example, the depth data may be a grid of sparse depth values, such as a 12×12 grid of 144 values of depth data. In some implementations, a device may include a depth camera that acquires a sparse set of depths, e.g., 20 depth values. A densified depth image may be generated from the sparse depth data by extrapolating depth values for additional pixel positions. The device may include sensors for tracking the devices/depth camera's particular position and orientation (i.e., pose) using odometry, visual inertial odometry (VIO), simultaneous localization and mapping (SLAM), etc., and this position/pose data can be used to align the depth data with light intensity image data.

The exemplary method further involves determining a plane hypothesis based on the depth data using a first technique. In some implementations, the first technique is a plane detection process that can include determining plane hypotheses using small patches of neighboring depth points, determining depth points associated with each of the plane hypotheses based on depth point positions, merging the hypotheses, and refining the hypotheses based on cohesion/continuity testing. For example, a plane hypothesis may include points, plane normal vectors, distances, and/or uncertainty.

The exemplary method further involves identifying a subset of the depth data based on determining the plane hypothesis. For example, when two such hypotheses have comparable normal-to-the-plane vectors and distances, the parameters of only one of them are included and all the points contained in both. Alternatively, only the points of the most populous plane hypothesis are included. In an exemplary implementation, the subset includes a subset of the depth data that is less than all of the points of the depth data. Alternatively, the subset could include all of the data points, e.g., if the sensor is facing a large wall, all data points may pass the identification process described herein.

The exemplary method further involves determining a plane based on the subset of the depth data using a second technique, where the second technique is different than the first technique. In some implementations, the second technique is a plane extraction process that can include computing a centroid and covariance matrix, and performing an eigenvalue decomposition to identify an eigenvector corresponding to the plane. For example, the covariance calculation may change the coordinate system to facilitate more efficient processing, resulting in a diagonal covariance matrix. In some implementations, the second technique is more processing intensive than the first technique (e.g., more computational resources may be required for fine tuning processes of the second technique).

In some implementations, the first technique includes determining plane hypotheses using small patches of neighboring depth points. For example, the small patches of neighboring depth points could include 2×2 patches, where each patch can include a normal vector and a distance value. In some implementations, the first technique further includes determining depth points associated with each of the plane hypotheses based on depth point positions. For example, determining depth points associated with each of the plane hypotheses may include comparing and/or matching the plane hypotheses and voting on which, if any, match. In some implementations, the first technique further includes merging sets of the plane hypotheses based on plane normal vectors and distances associated with the plane hypotheses. For example, when two such hypotheses have comparable normal-to-the-plane vectors and distances, the parameters of only one of them are included and all the points contained in both. Alternatively, only the points of the most populous plane hypothesis are included.

In some implementations, the first technique further includes refining the plane hypotheses based on cohesion evaluations. For example, a plane detection process can include merging similar hypotheses and then checking the resulting planes for cohesion (e.g., spatial continuity). In some implementations, refining the plane hypotheses can include computing the distances between all points belonging in a plane hypothesis and rejecting the points whose mean (or median) distance to all other points is larger than the mean (or median) distance across all points. Additionally, or alternatively, refining a plane hypothesis can include projecting the 3D points on the 2D plane they form, computing their convex hull, and counting amongst all 3D points the number of outliers within this convex hull. Outliers are considered the 3D points whose ray connecting the sensor with a 3D point intersects the detected plane at a point which lies within the convex hull. For example, the plane detection process can include accepting the plane if the ratio of inliers to outliers is above a ratio threshold (e.g., a ratio threshold of 50% such that at least half of the points are within the plane's convex hull). If the ratio of inliers to outliers is equal to or below the ratio threshold, the plane detection process can either discard the plane, or divide the plane into smaller planes and repeat the process (e.g., refining the plane hypothesis based on cohesion evaluations for each smaller plane).

In some implementations, the second technique (e.g., a plane extraction process) includes computing a centroid and covariance matrix, and performing an eigenvalue decomposition to identify an eigenvector corresponding to the plane. In some implementations, computing the covariance includes applying a coordinate system transformation to make the estimated covariance a diagonal matrix. For example, the plane extraction takes as input a 3D point cloud that potentially (with high probability) belongs to a planar region and removes potential outliers to estimate the plane-parameters along with their covariance. The estimated covariance offers a measure of confidence in the plane-parameter estimates which can be potentially used by subsequent algorithms fusing information from these planes across time and space for performing, e.g., VIO, 3D mapping, and the like.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
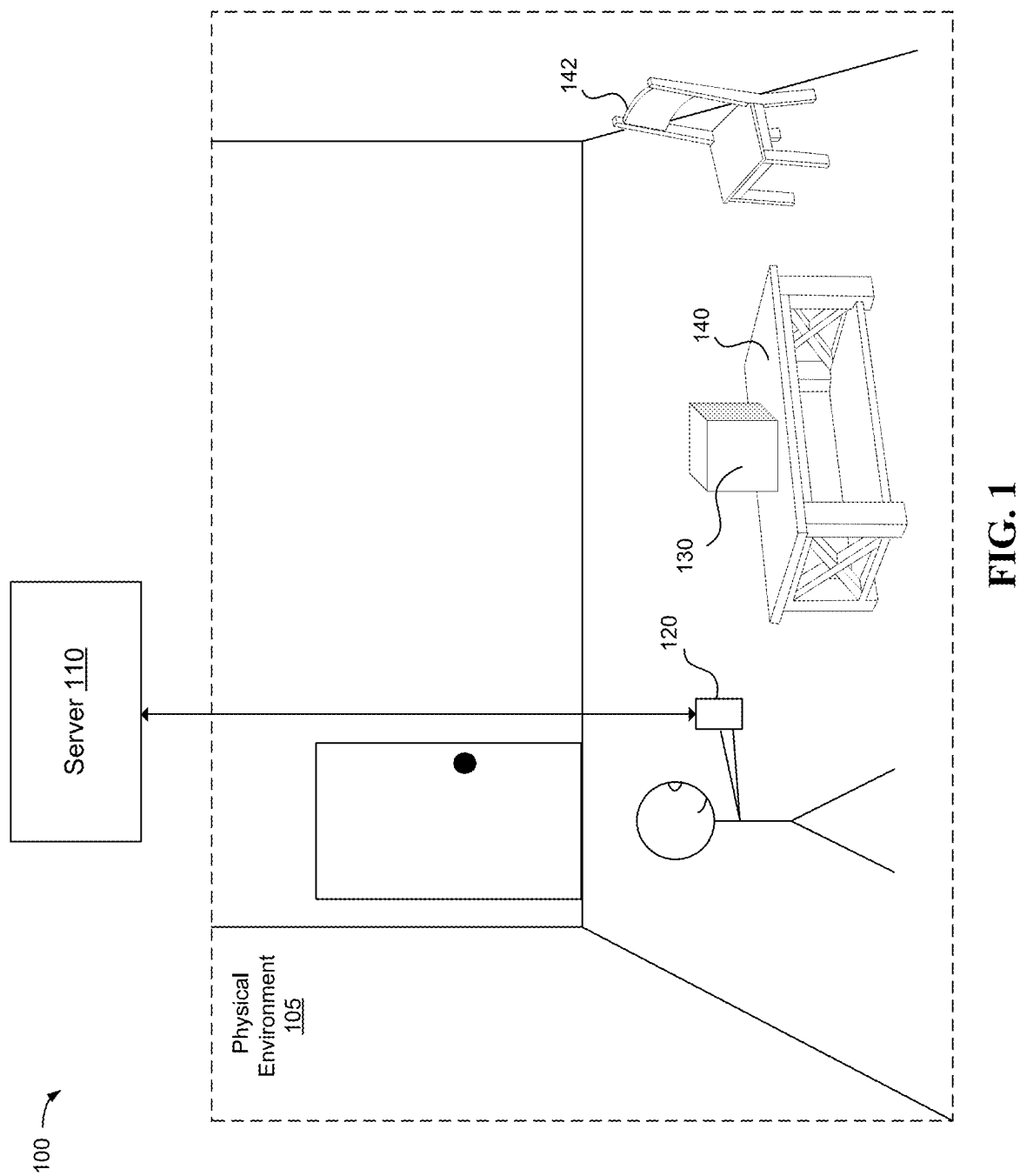
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. In this example, the example operating environment 100 illustrates an example physical environment 105 that includes an object 130, table 140, and chair 142. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a server 110 and a device 120. In an exemplary implementation, the operating environment 100 does not include a server 110, and the methods described herein are performed on the device 120.

In some implementations, the server 110 is configured to manage and coordinate an experience for the user. In some implementations, the server 110 includes a suitable combination of software, firmware, and/or hardware. The server 110 is described in greater detail below with respect to FIG. 2. In some implementations, the server 110 is a computing device that is local or remote relative to the physical environment 105. In one example, the server 110 is a local server located within the physical environment 105. In another example, the server 110 is a remote server located outside of the physical environment 105 (e.g., a cloud server, central server, etc.). In some implementations, the server 110 is communicatively coupled with the device 120 via one or more wired or wireless communication channels (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the server 110 are provided by and/or combined with the device 120.

In some implementations, the device 120 is a handheld electronic device (e.g., a smartphone or a tablet) configured to present content to the user. In some implementations, the user 102 wears the device 120 on his/her head. As such, the device 120 may include one or more displays provided to display content. For example, the device 120 may enclose the field-of-view of the user 102. In some implementations, the device 120 is replaced with a chamber, enclosure, or room configured to present content in which the user 102 does not wear or hold the device 120.

Figure 2:
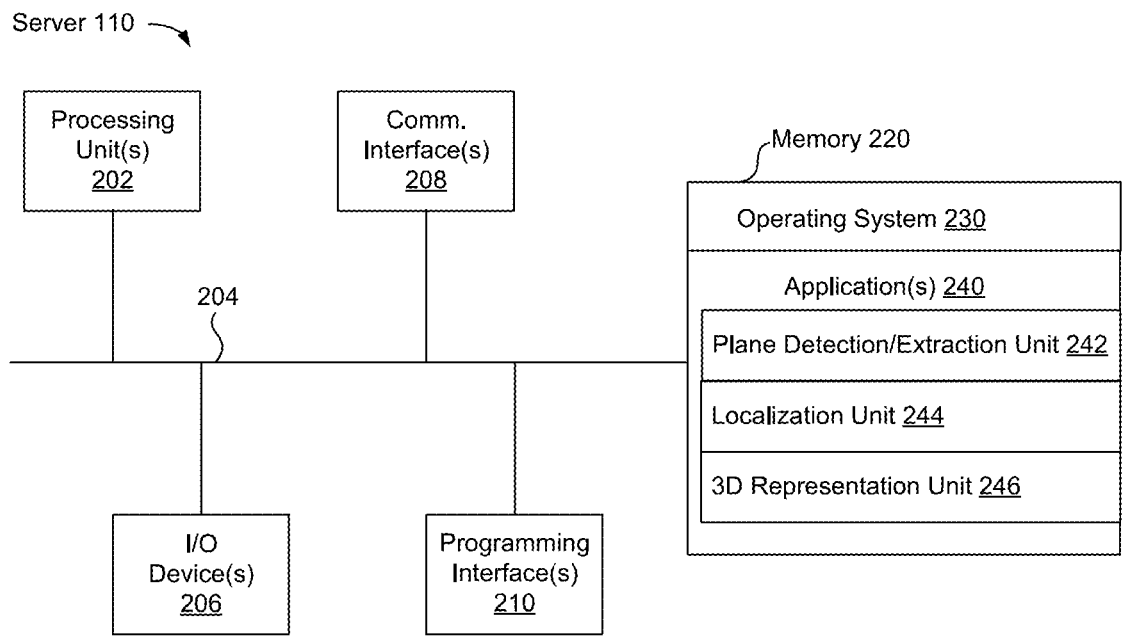
FIG. 2 is a block diagram of an example server in accordance with some implementations.

FIG. 2 is a block diagram of an example of the server 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the server 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 includes a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the applications 240 are configured to manage and coordinate one or more experiences for one or more users (e.g., a single experience for one or more users, or multiple experiences for respective groups of one or more users).

The applications 240 include a plane detection/extraction unit 242, a localization unit 244, and a three-dimensional (3D) representation unit 246. The plane detection/extraction unit 242, the localization unit 244, and the 3D representation unit 246 can be combined into a single application or unit or separated into one or more additional applications or units.

The plane detection/extraction unit 242 is configured with instructions executable by a processor to obtain sensor data (e.g., depth data, motion data, etc.) and identify planes in depth data using a two-stage process that first, detects which of the depth points are likely planes, and second, selectively uses only those depth points to accurately and efficiently extract planes using one or more of the techniques disclosed herein. For example, the plane detection/extraction unit 242 analyzes depth data from a depth camera (sparse depth map from a depth camera such as a time-of-flight sensor) and motion data from a motion sensor (e.g., gyroscope, accelerometer, etc.) and/or other sources of physical environment information (e.g., camera positioning information from a camera's SLAM system, a visual inertial odometry (VIO) system, or the like) to detect and extract planes of a physical environment within the depth data (e.g., 3D point classification and plane-parameter estimation). In some implementations, the plane detection/extraction unit 242 includes a plane detection unit to perform a plane detection process that can include determining a plane hypotheses using small patches of neighboring depth points, determining depth points associated with each of the plane hypotheses based on depth point positions, merging the hypotheses, and refining the hypotheses based on cohesion/continuity testing. Additionally, the plane detection/extraction unit 242 can include a plane extraction unit to perform a plane extraction process that can include computing a centroid and covariance matrix, and performing an eigenvalue decomposition to identify an eigenvector corresponding to the plane.

The localization unit 244 is configured with instructions executable by a processor to obtain sensor data (e.g., light intensity image data, depth data, etc.) and track a location of a moving device in a 3D coordinate system based on plane extraction data using one or more of the techniques disclosed herein. For example, the localization unit 244 analyzes light intensity data from a light intensity camera, depth data from a depth camera, plane extraction data (e.g., from the plane detection/extraction unit 242), and/or other sources of physical environment information (e.g., camera positioning information from a camera's SLAM system, a visual inertial odometry (VIO) system, or the like) to track device location information for 3D reconstruction (e.g., 3D representations of virtual content generated for an extended reality (XR) experience that can display both real-world objects of a physical environment and virtual content).

The 3D representation unit 246 is configured with instructions executable by a processor to obtain tracking information for the device, image data (e.g., RGB and depth data), and other sources of physical environment information (e.g., camera positioning information from a camera's SLAM system, VIO, or the like), and generates 3D representation data using one or more techniques disclosed herein. For example, the 3D representation unit 246 obtains localization data from the localization unit 244, obtains or generates segmentation data (e.g., semantically labeled RGB image data such as RGB-S data) based on obtained image data (e.g., RGB and depth data), obtains other sources of physical environment information (e.g., camera positioning information), and generates a 3D representation (e.g., a 3D mesh representation, a 3D point cloud with associated semantic labels, or the like) for an XR experience.

Although these elements are shown as residing on a single device (e.g., the server 110), it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
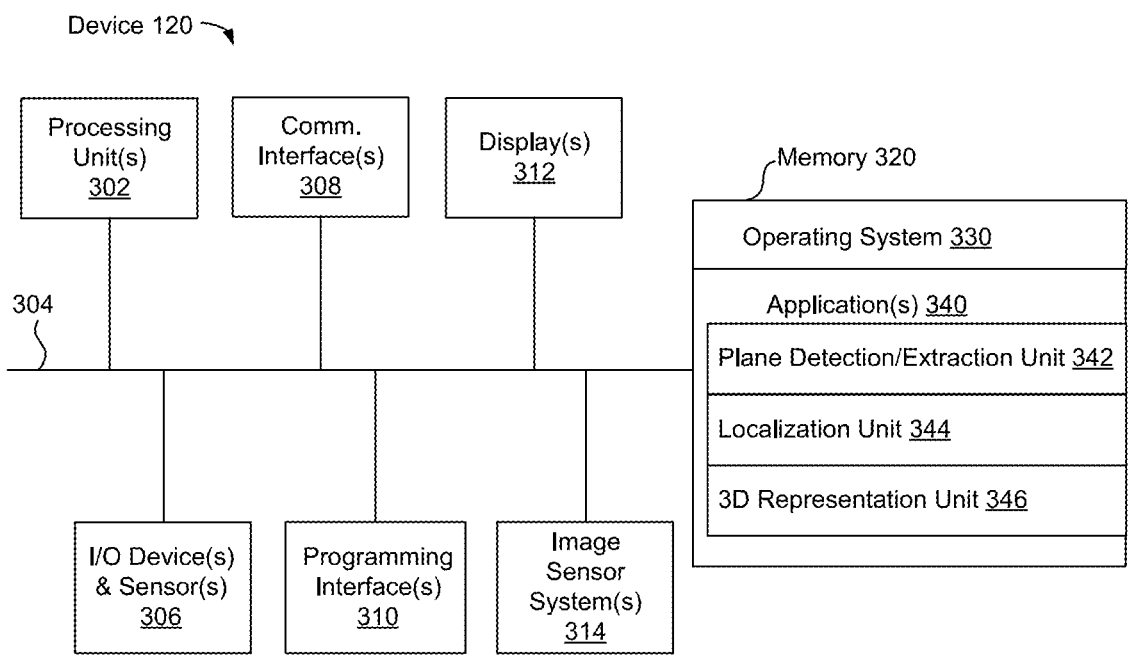
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, an ambient light sensor (ALS), one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes a display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 includes a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the applications 340 are configured to manage and coordinate one or more experiences for one or more users (e.g., a single experience for one or more users, or multiple experiences for respective groups of one or more users).

The applications 340 include a plane detection/extraction unit 342, a localization unit 344, and a three-dimensional (3D) representation unit 346. The plane detection/extraction unit 342, the localization unit 344, and the 3D representation unit 346 can be combined into a single application or unit or separated into one or more additional applications or units.

The plane detection/extraction unit 342 is configured with instructions executable by a processor to obtain sensor data (e.g., depth data, motion data, etc.) and identifies planes in depth data using a two-stage process that first, detects which of the depth points are likely planes, and then, selectively uses only those depth points to accurately and efficiently extract planes using one or more of the techniques disclosed herein. For example, the plane detection/extraction unit 342 analyzes depth data from a depth camera (sparse depth map from a depth camera such as a time-of-flight sensor) and motion data from a motion sensor (e.g., gyroscope, accelerometer, etc.) and/or other sources of physical environment information (e.g., camera positioning information from a camera's SLAM system, a visual inertial odometry (VIO) system, or the like) to detect and extract planes of a physical environment within the depth data (e.g., 3D point classification and plane-parameter estimation). In some implementations, the plane detection/extraction unit 342 includes a plane detection unit to perform a plane detection process that can include determining a plane hypothesis using small patches of neighboring depth points, determining depth points associated with each of the plane hypotheses based on depth point positions, merging the hypotheses, and refining the hypotheses based on cohesion/continuity testing. Additionally, the plane detection/extraction unit 342 can include a plane extraction unit to perform a plane extraction process that can include computing a centroid and covariance matrix and performing an eigenvalue decomposition to identify an eigenvector corresponding to the plane.

The localization unit 344 is configured with instructions executable by a processor to obtain sensor data (e.g., light intensity image data, depth data, etc.) and track a location of a moving device in a 3D coordinate system based on plane extraction data using one or more of the techniques disclosed herein. For example, the localization unit 344 analyzes light intensity data from a light intensity camera, depth data from a depth camera, plane extraction data (e.g., from the plane detection/extraction unit 342), and/or other sources of physical environment information (e.g., camera positioning information from a camera's SLAM system, a visual inertial odometry (VIO) system, or the like) to track device location information for 3D reconstruction (e.g., 3D representations of virtual content generated for an extended reality (XR) experience that can display both real-world objects of a physical environment and virtual content).

The 3D representation unit 346 is configured with instructions executable by a processor to obtains tracking information for the device, image data (e.g., RGB and depth data), and other sources of physical environment information (e.g., camera positioning information from a camera's SLAM system, VIO, or the like), and generates 3D representation data using one or more techniques disclosed herein. For example, the 3D representation unit 346 obtains localization data from the localization unit 344, obtains or generates segmentation data (e.g., RGB-S data) based on obtained image data (e.g., RGB and depth data), obtains other sources of physical environment information (e.g., camera positioning information), and generates a 3D representation (e.g., a 3D mesh representation, a 3D point cloud with associated semantic labels, or the like) for an XR experience.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
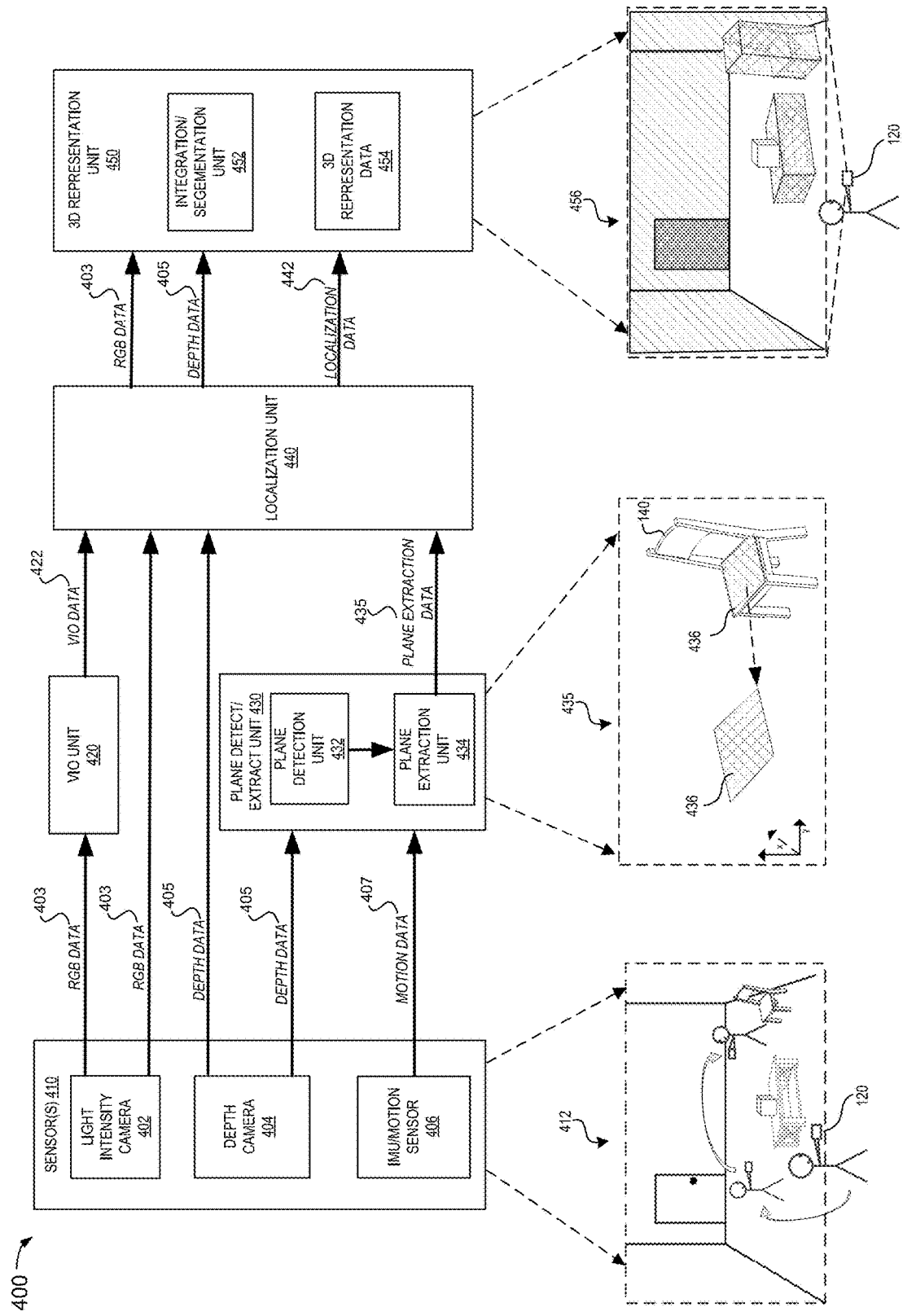
FIG. 4 is a system flow diagram of an example generation of three-dimensional (3D) data based on localization of a device that is based on plane detection and extraction of depth data acquired by the device according to some implementations.

FIG. 4 is a system flow diagram of an example environment 400 tracks a location of a moving device in a 3D coordinate system based on estimates of the 3D point classification and plane-parameter estimations of the physical environment with respect to the device, and generates 3D representation data for at least a portion of the physical environment using the localization data in accordance with some implementations. In some implementations, the system flow of the example environment 400 is performed on a device (e.g., server 110 or device 120 of FIGS. 1-3), such as a mobile device, desktop, laptop, or server device. The system flow of the example environment 400 can be displayed on a device (e.g., device 120 of FIGS. 1 and 3) that has a screen for displaying images and/or a screen for viewing stereoscopic images such as a head-mounted display (HMD). In some implementations, the system flow of the example environment 400 is performed on processing logic, including hardware, firmware, software, or a combination thereof. In some implementations, the system flow of the example environment 400 is performed on a processor executing code stored in a non-transitory computer-readable medium (e.g., a memory).

The system flow of the example environment 400 acquires, utilizing a plurality of sensor(s) 410, light intensity image data 403 (e.g., live camera feed such as RGB from light intensity camera 402), depth image data 405 (e.g., depth image data such as RGB-D from depth camera 404), motion data 407 (e.g., motion trajectory data from motion sensor(s) 406) of a physical environment (e.g., the physical environment 105 of FIG. 1), acquires positioning information (e.g., VIO unit 420 determines VIO data based on the light intensity image data 403), assesses the depth data 405 and motion data 407 to determine plane extraction data 435 of the physical environment with respect to the device (e.g., the plane detection/extraction unit 430), assesses the plane extraction data 435 and determines localization data 442 of the device (e.g., the localization unit 440), and generates 3D representation data 454 from the acquired sensor data (e.g., light intensity image data, depth data, and the like) and from the localization data 442 (e.g., the 3D representation unit 450). In some implementations, other sources of physical environment information can be acquired (e.g., camera positioning information such as position and orientation data from position sensors) as opposed to using a VIO system (e.g., VIO unit 420).

In an example implementation, the environment 400 includes an image composition pipeline that acquires or obtains data (e.g., image data from image source(s), motion data, etc.) for the physical environment. Example environment 400 is an example of acquiring image sensor data (e.g., light intensity data, depth data, and motion data) for a plurality of image frames. For example, as illustrated in example environment 412, a user is walking around a room acquiring sensor data from sensor(s) 410. The image source(s) may include a light intensity camera 402 (e.g., RGB camera) that acquires light intensity image data 403 (e.g., a sequence of RGB image frames), a depth camera 404 that acquires depth data 405, and a motion sensor 406 that acquires motion data 407.

For positioning information, some implementations include a VIO system (e.g., VIO unit 420) to determine equivalent odometry information (e.g., VIO data 422) using sequential camera images (e.g., light intensity image data 403) to estimate the distance traveled. Alternatively, some implementations of the present disclosure may include a simultaneous localization and mapping (SLAM) system (e.g., position sensors within the sensors 410). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the environment 400 includes a plane detection/extraction unit 430 that is configured with instructions executable by a processor to obtain sensor data (e.g., depth data 405 such as a sparse data map and motion data 407 such as motion trajectory data) and determines plane extraction information (e.g., plane extraction data 435) with respect to the physical environment using one or more of the techniques disclosed herein. For example, as illustrated in example environment 435, a horizontal plane 436 (e.g., the seat of the chair 140) is detected by the plane detection/extraction unit 430. The horizontal plane 436 may include plane-parameter information such as normal-to-the plane vectors, distance data, 3D coordinates of each detected point on the plane 436, and the like.

In some implementations, the plane detection/extraction unit 430 includes a plane detection unit 432 that is configured with instructions executable by a processor to perform a plane detection process that can include determining a plane hypothesis using small patches of neighboring depth points, determining depth points associated with each of the plane hypotheses based on depth point positions, merging the hypotheses, and refining the hypotheses based on cohesion/continuity testing based on the obtained depth data 405 and the motion data 407. For example, the plane detection unit 432 of the plane detection/extraction unit 430 (e.g., plane detection/extraction unit 242 of FIG. 2 and/or plane detection/extraction unit 342 of FIG. 3) analyzes depth data from the depth camera 404 and motion data 407 from the motion sensor(s) 406 to determine which depth points are likely planes. For example, plane detection unit 432 acquires 3D points (e.g., sparse depth data such as 144 depth points in a 12×12 grid), creates plane hypotheses, determines whether each point belongs in one or more of these hypotheses, and subsequently, plane detection unit 432 merges similar hypotheses and checks the resulting planes for cohesion (e.g., spatial continuity).

In some implementations, plane detection/extraction unit 430 includes a plane extraction unit 434 that is configured with instructions executable by a processor to perform a plane extraction process that can efficiently extract planes and include a refinement process, such as computing a centroid and covariance matrix and performing an eigenvalue decomposition to identify an eigenvector corresponding to the plane. For example, the plane extraction unit 434 of the plane detection/extraction unit 430 (e.g., plane detection/extraction unit 242 of FIG. 2 and/or plane detection/extraction unit 342 of FIG. 3) analyzes the plane detection information from the plane detection unit 432 to refine the plane-parameter estimation and perform outlier rejections. For example, the plane extraction unit 434 takes as input a 3D point cloud that potentially (with high probability) belongs to a planar region (e.g., plane detection information from the plane detection unit 432). The goal is to remove potential outliers and precisely estimate the plane-parameters along with their covariance. The estimated covariance offers a measure of confidence in the plane-parameter estimates and can be potentially used by subsequent algorithms fusing information from the detected planes across time and space for performing, e.g., VIO, 3D mapping, and the like.

In an example implementation, the environment 400 further includes a localization unit 440 that is configured with instructions executable by a processor to obtain sensor data (e.g., RGB data 403, depth data 405, etc.), obtain plane extraction data 435 from the plane detection/extraction unit 430, and track a location of a moving device in a 3D coordinate system based on the plane extraction data using one or more techniques. For example, the localization unit 440 (e.g., localization unit 244 of FIG. 2 and/or localization unit 344 of FIG. 3) analyzes RGB images from a light intensity camera 402 with a sparse depth map from a depth camera 404 (e.g., time-of-flight sensor), plane extraction data 435 (e.g., plane estimation parameters from the plane detection/extraction unit 430), and other sources of physical environment information (e.g., camera positioning information such as VIO data 422 from the VIO unit 420, or a camera's SLAM system, or the like) to generate localization data 442 by tracking device location information for 3D reconstruction (e.g., a 3D model representing the physical environment of FIG. 1).

In an example implementation, the environment 400 further includes a 3D representation unit 450 that is configured with instructions executable by a processor to obtain the sensor data (e.g., RGB data 403, depth data 405, etc.) and localization data 442 from the localization unit 440 and generate 3D representation data 454 using one or more techniques. For example, the 3D representation unit 450 (e.g., 3D representation unit 246 of FIGS. 2 and/or 3D representation unit 346 of FIG. 3) analyzes RGB images from a light intensity camera 402 with a sparse depth map from a depth camera 404 (e.g., time-of-flight sensor) and other sources of physical environment information (e.g., camera positioning information such as VIO data 422 from the VIO unit 420, or a camera's SLAM system, or the like) to generate 3D representation data 456 (e.g., a 3D model representing the physical environment of FIG. 1).

The 3D representation data 454 could be 3D representations representing the surfaces in a 3D environment using a 3D point cloud with associated semantic labels. The 3D representations may be 3D bounding boxes for each detected object of interest, such as object 130, table 140, and chair 142. In some implementations, the 3D representation data 454 is a 3D reconstruction mesh that is generated using a meshing algorithm based on depth information detected in the physical environment that is integrated (e.g., fused) to recreate the physical environment. A meshing algorithm (e.g., a dual marching cubes meshing algorithm, a Poisson meshing algorithm, a tetrahedral meshing algorithm, or the like) can be used to generate a mesh representing a room (e.g., physical environment 105) and/or object(s) within a room (e.g., object 130, table 140, chair 142, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

In some implementations, the 3D representation unit 450 includes an integration unit (e.g., integration/segmentation unit 452) that is configured with instructions executable by a processor to obtain the subset of image data (e.g., light intensity data 403, depth data 405, etc.) and positioning information (e.g., camera pose information from the VIO unit 420) and integrate (e.g., fuse) the subset of image data using one or more known techniques. For example, the image integration unit receives a subset of depth image data 405 (e.g., sparse depth data) and a subset of intensity image data 403 (e.g., RGB) from the image sources (e.g., light intensity camera 402 and depth camera 404), and integrates the subset of image data and generates 3D data. The 3D data can include a dense 3D point cloud (e.g., imperfect depth maps and camera poses for a plurality of image frames around the object) that is sent to the 3D representation unit 450. The 3D data can also be voxelized.

In some implementations, the 3D representation unit 450 includes a semantic segmentation unit (e.g., integration/segmentation unit 452) that is configured with instructions executable by a processor to obtain a subset the light intensity image data (e.g., light intensity data 403) and identify and segment wall structures (wall, doors, windows, etc.) and objects (e.g., person, table, teapot, chair, vase, etc.) using one or more known techniques. For example, the segmentation unit receives a subset of intensity image data 403 from the image sources (e.g., light intensity camera 402), and generates segmentation data (e.g., semantic segmentation data such as RGB-S data). In some implementations, a segmentation unit uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

Figure 5:
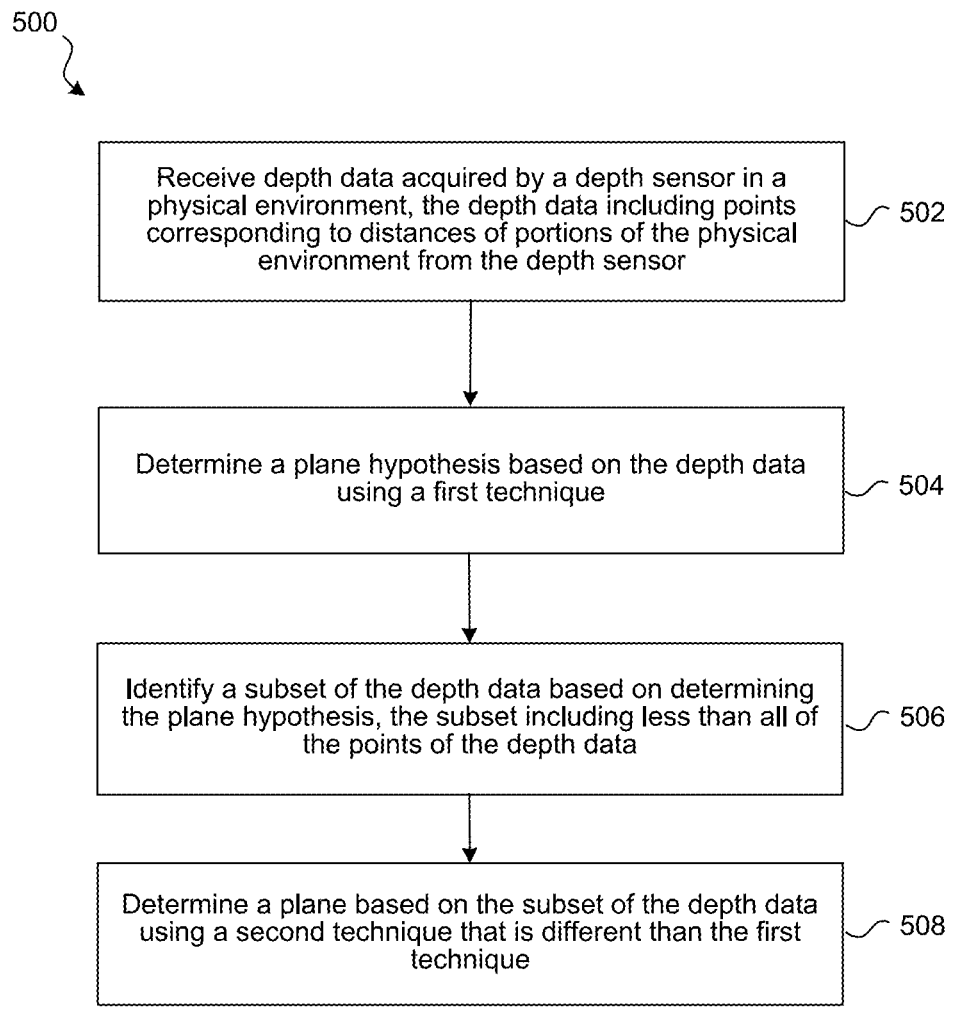
FIG. 5 is a flowchart representation of an exemplary method that identifies planes in depth data in accordance with some implementations.

FIG. 5 is a flowchart representation of an exemplary method 500 that identifies planes in depth data using a two-stage process that first, detects which of the depth points are likely planes, and second, selectively uses only those depth points to accurately and efficiently extract planes (e.g., identifying depth points on a plane, normal vector, distance, and covariance) in accordance with some implementations. In some implementations, the method 500 is performed by a device (e.g., server 110 or device 120 of FIGS. 1-3), such as a mobile device, desktop, laptop, or server device. The method 500 can be performed on a device (e.g., device 120 of FIGS. 1 and 3) that has a screen for displaying images and/or a screen for viewing stereoscopic images such as a head-mounted display (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). The tracking process of method 500 is illustrated with reference to FIGS. 6-8.

At block 502, the method 500 receives depth data (e.g., a densified depth image) acquired by a depth sensor in a physical environment, the depth data including points corresponding to distances of portions of the physical environment from the depth sensor. For example, the depth data may be a grid of sparse depth values, such as a 12×12 grid of 144 values of depth data. In some implementations, a device may include a depth camera that acquires a sparse set of depths, e.g., 20 depth values for particular locations. A densified depth image may be generated from the sparse depth data by extrapolating depth values for additional pixel positions. The device may include sensors for tracking the devices/depth camera's particular position and orientation (i.e., pose) using odometry, visual inertial odometry (VIO), simultaneous localization and mapping (SLAM), etc., and this position/pose data can be used to align the depth data with light intensity image data. An example grid of sparse depth values with respect to an object in a physical environment (e.g., chair 142 of the physical environment 105 of FIG. 1) is described herein with respect to FIG. 6.

At block 504, the method 500 determines a plane hypothesis based on the depth data using a first technique. In some implementations, the first technique is a plane detection process that can include determining a plane hypothesis using small patches of neighboring depth points, determining depth points associated with each of the plane hypotheses based on depth point positions, merging the hypotheses, and refining the hypotheses based on cohesion/continuity testing. For example, the plane hypothesis may include points, plane normal vectors, distances, and/or an uncertainty value(s). Determining a plane hypothesis is further described herein with respect to FIG. 7.

In some implementations, the first technique includes determining a plane hypothesis using small patches of neighboring depth points. For example, the small patches of neighboring depth points could include 2×2 patches, each patch including a normal vector and a distance value (e.g., distance to the plane). In some implementations, the first technique further includes determining depth points associated with each of the plane hypotheses based on depth point positions. For example, determining depth points associated with each of the plane hypotheses may include comparing and/or matching the plane hypotheses and determining which, if any, match. In some implementations, the first technique further includes merging sets of the plane hypotheses based on plane normal vectors and distances associated with the plane hypotheses. For example, when two such hypotheses have comparable normal-to-the-plane vectors and distances, the parameters of only one of them are included and all the points contained in both. Alternatively, only the points of the most populous plane hypothesis are included.

In some implementations, the first technique includes point hypothesis testing that can include an evaluation of whether each 3D point satisfies one or more of the hypotheses. For example, a point $p_i$, belongs into the plane $\pi_j$ with parameters $(d_j, n_j)$ iff $$|p_i^T * n_j - d_j| < \varepsilon$$

for a threshold $\varepsilon$. In accordance with some implementations, since N×M tests need to be performed efficiently, two matrices are formed, a matrix $A_p$ of dimensions N×3 containing the transpose of all points and a matrix $A_n$ of dimensions M×3 including all the plane normals and multiply them to compute the matrix $A_H$ of dimensions N×M. The distance $d_j$ can be subtracted from all the elements of each column j=1 . . . M, of the $A_H$ matrix. The absolute value of all elements of the $A_H$ matrix are then compared to the threshold $\varepsilon$. The elements of $A_H$ are switched to 1 if below threshold $\varepsilon$, and switched to 0 if above or equal to threshold $\varepsilon$. The switching of elements to 1 or 0 determines a membership matrix, where each point may belong into one or more planes $\pi_j$, j=1 . . . M. At the end of the switching process, the hypotheses that contain more than L points (e.g., L=10) are selected and passed to the next step (e.g., selecting a subset of data points determined to be in the same plane).

In some implementations, the first technique further includes refining the plane hypothesis based on cohesion evaluations. For example, a plane detection process can include merging similar hypotheses and then checking the resulting planes for cohesion (e.g., spatial continuity). In some implementations, refining the plane hypotheses can include computing the distances between all points belonging into a plane hypothesis and rejecting the points whose mean (or median) distance to all other points is larger than the mean (or median) distance across all points. Regarding cohesion evaluations, in some implementations, clusters of points belonging to spatially-separated planar patches, may be merged into one plane hypothesis, or a set of points forming a line segment and a far-away point may be combined to form a plane. These cases can be inaccurate or ill-conditioned planes that can be removed to increase accuracy of the detected data points associated with a plane.

Figure 8:
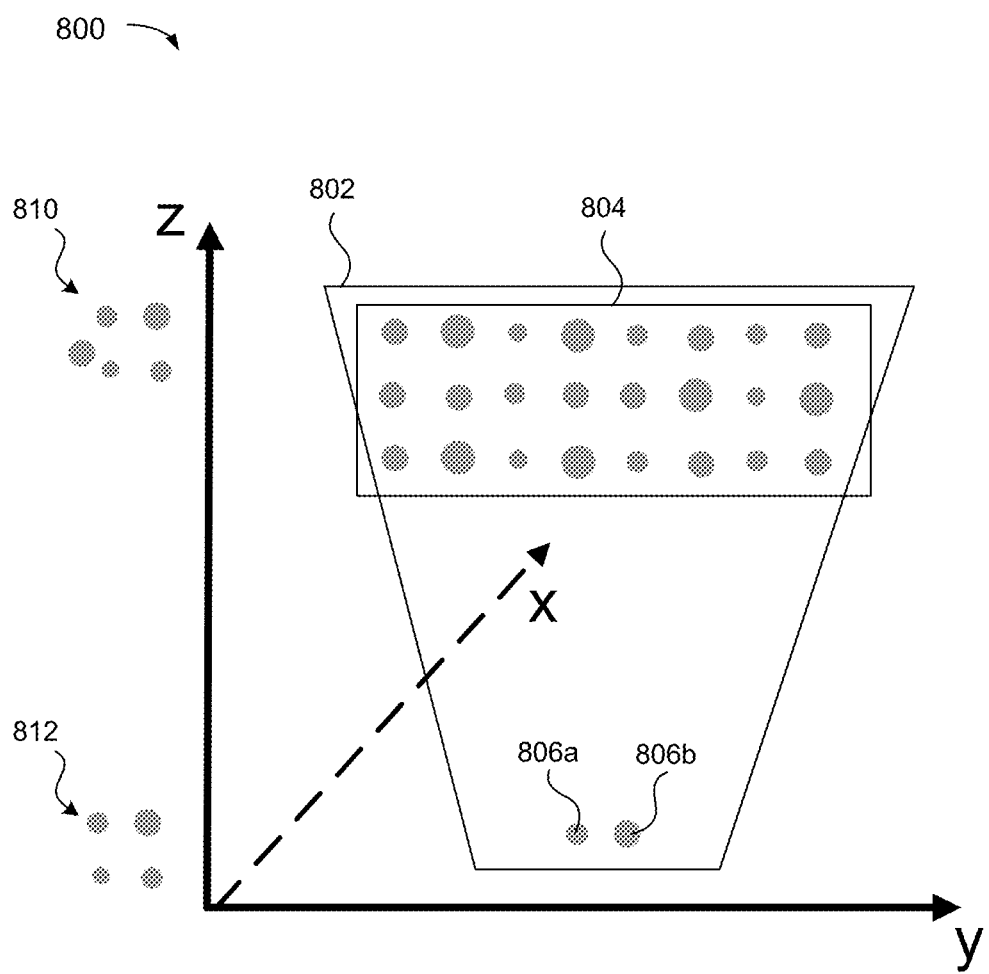
FIG. 8 is a block diagram illustrating an example refining process for depth points of a detected plane in accordance with some implementations.

In some implementations, removing the cluster of points can include determining the distances between all points belonging into a plane hypothesis and rejecting the points whose mean (or median) distance to all other points is larger than the mean (or median) distance across all points. Additionally, or alternatively, refining a plane hypothesis can include projecting the 3D points on the 2D plane they form, computing their convex hull, and counting amongst all 3D points the number of outliers within this convex hull. Outliers are considered the 3D points whose ray connecting the sensor with a 3D point intersects the detected plane at a point which lies within the convex hull. For example, the plane detection process can include accepting the plane if the ratio of inliers to outliers is above a ratio threshold (e.g., a ratio threshold of 50% such that at least half of the points are within the plane's convex hull). If the ratio of inliers to outliers is equal to or below the ratio threshold, the plane detection process can either discard the plane, or divide the plane into smaller planes and repeat the process (e.g., refining the plane hypothesis based on cohesion evaluations for each smaller plane). The output of the algorithm for removing the cluster of points can include setting a plane hypothesis $\pi_j$ with approximate parameters $(d_j, n_j)$ and the set of points that belongs to each of these planes. Additionally, or alternatively, providing robust planes is also based on a ratio of the detected plane length to the detected plane width in order to determine whether the detected plane should be classified as a plane or a "wide" line strip. FIG. 8, described herein, is an example block diagram illustrating an example refining process (e.g., cohesion evaluations) for depth values of a detected plane in accordance with some implementations.

Additionally, or alternatively, refining the plane hypotheses during hypotheses merging can include limiting the number of parameters analyzed due to duplicate parameters. For example, the parameters of many of the plane hypotheses generated have similar values corresponding to the same plane. Directly comparing all-to-all plane hypotheses for detecting duplicates would require M*(M−1)/2 comparisons which can be a large number and require more processing capability than necessary. Thus, the hypothesis comparison can be limited to among the M'<<M hypotheses that contain, for example, 10 or more points. When two such hypotheses have comparable normal-to-the-plane vectors and distances, the parameters of only one of them need to be included and include all the points contained in both. Alternatively, only the points of the most populous plane hypothesis are included.

At block 506, the method 500 identifies a subset of the depth data based on determining the plane hypothesis. For example, when two such hypotheses have comparable normal-to-the-plane vectors and distances, the parameters of only one of them are included and all the points contained in both. Alternatively, only the points of the most populous plane hypothesis are included. In an exemplary implementation, the subset includes a subset of the depth data that is less than all of the points of the depth data. Alternatively, the subset could include all of the data points, e.g., if the sensor is facing a large wall, all data points may pass the identification process described herein.

At block 508, the method 500 determines a plane based on the subset of the depth data using a second technique, the second technique different than the first technique. For example, the second technique is a plane extraction process that focuses on precise plane-parameter estimation and outlier rejection (e.g., refinement of the first technique). In some implementations, the second technique is a plane extraction process that can include computing a centroid and covariance matrix and performing an eigenvalue decomposition to identify an eigenvector corresponding to the plane. For example, the covariance calculation may change the coordinate system to facilitate more efficient processing. In some implementations, the second technique is more processing intensive than the first technique.

In some implementations, the second technique (e.g., a plane extraction process) includes computing a centroid and covariance matrix and performing an eigenvalue decomposition to identify an eigenvector corresponding to the plane. In some implementations, computing the covariance includes applying a coordinate system transformation to make the estimated covariance a diagonal matrix. For example, the plane extraction acquires a 3D point cloud that potentially (with high probability) belongs to a planar region and removes potential outliers to estimate the plane-parameters along with their covariance. The estimated covariance offers a measure of confidence in the plane-parameter estimates which can be potentially used by subsequent algorithms fusing information from these planes across time and space for performing, e.g., VIO, 3D mapping, and the like.

In some implementations, the second technique (e.g., a plane extraction process) includes a plane-parameter estimation that is similar to the first technique. For example, employing the points covariance matrix to first determine the normal to the plane and then using that to compute the distance. However, the second technique would analyze all candidate points belonging to a plane instead of just four points for generating a hypothesis as is processed in the first technique.

In some implementations, the second technique (e.g., a plane extraction process) includes outlier rejection that, after a plane's parameters have been estimated, can include classifying a plane's parameters as inliers and outliers based on the distance of each point from the plane. For example, a standard deviation, $\alpha_d$, of the distances of all the points from the plane can be computed. Where, for example, only points that are determined as inliers points whose distance from the plane is smaller than $\alpha^*\alpha_d$ are accepted. For example, determining which inlier points are smaller can be determined based on the following equation:

$$|p_i^T * n_j - d_j| < \alpha^* \sigma_d$$

In some implementations, the second technique (e.g., a plane extraction process) includes covariance estimation. For example, based on error assumptions (e.g., noise covariance: $\sigma_p^2 * 1_3$) for the 3D points provided to the first technique (e.g., a plane detection algorithm), covariance estimation can include determining the error variance $\sigma_d^2$ for the distance, d, and error covariance $Y_\theta^2 * 1_3$ for the normal to the plane, n, respectively. In some implementations, the error covariance is of a dimension 2×2, as an error in the estimation process can affect two degrees of freedom (DOF) of the estimate of n since it is a normal vector. These two DOF can be defined by the two vectors forming the null space of n, where n is the normal vector of the plane.

In use, for the process 500, a user may scan a room or an object within the room with a device (e.g., a smartphone such as device 120) and the processes described herein would acquire sensor data (e.g., motion data, image data such as light intensity data and depth data, camera position information, etc.), assess the sensor data, and determine plane-parameter data (e.g., plane extraction data 435) as the device moves in the physical environment.

Figure 6:
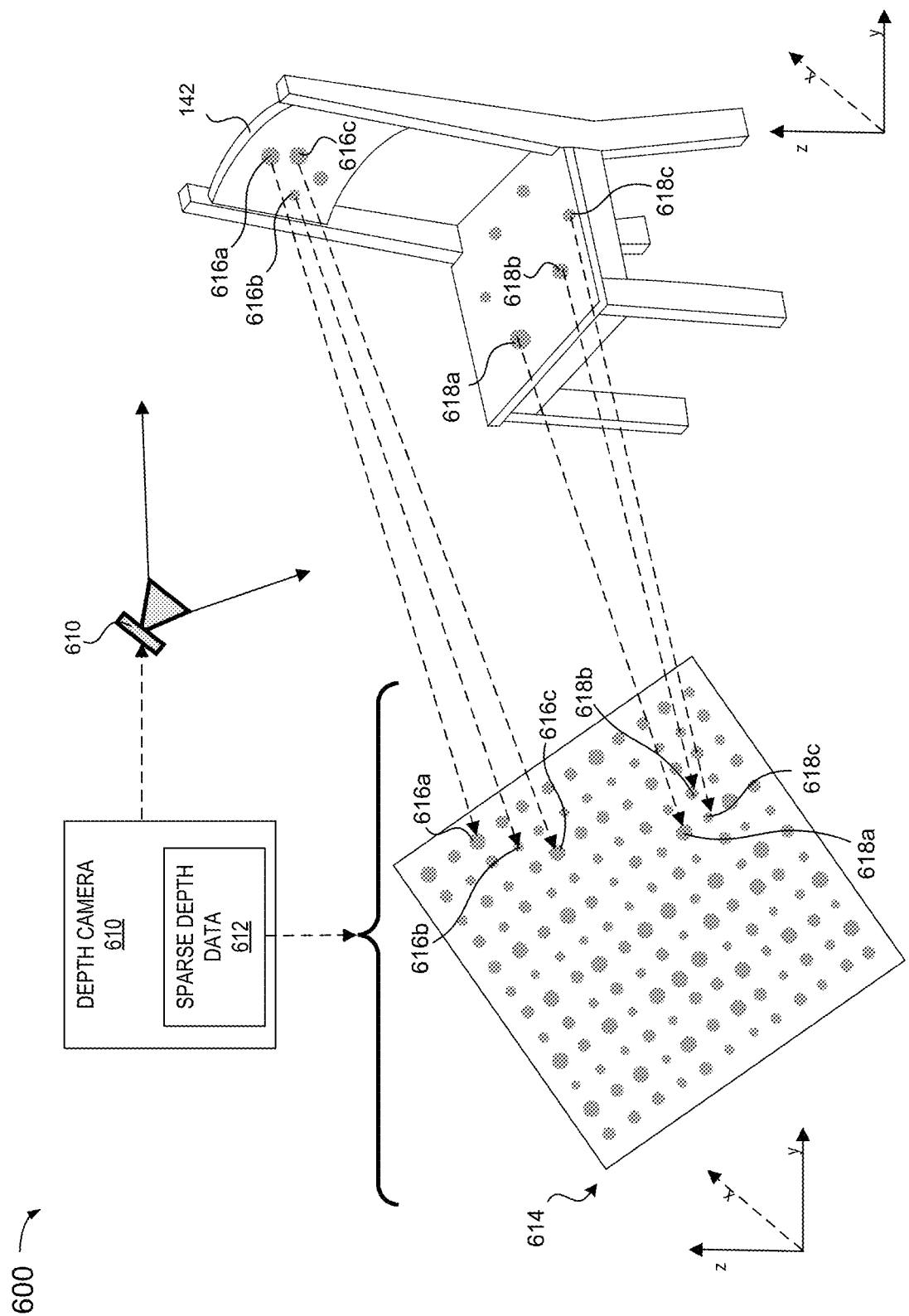
FIG. 6 is a block diagram illustrating an example grid of depth values acquired by a depth camera of a device in a physical environment in accordance with some implementations.

FIG. 6 is a block diagram illustrating an example grid of depth values acquired by a depth camera of a device in a physical environment in accordance with some implementations. In particular, FIG. 6 is a block diagram of an example operating environment 600 illustrating an example depth camera 610 (e.g., I/O devices(s) & sensor(s) 304 of the device 120, depth camera 404, or the like) that is acquiring depth data (e.g., sparse depth data 612). In this example, the example operating environment 600 illustrates an environment that includes a chair 142 from the physical environment 105 of FIG. 1, where the depth camera 610 field of view is of the chair 142. The sparse depth data 612 includes example data points 616a, 616b, 616c on the back of the chair (e.g., a vertical plane), and example data points 618a, 618b, and 618c on the seat of the chair (e.g., a horizontal plane). The depth value grid 614 is an example 12×12 grid of 144 depth values of sparse depth data acquired by the depth camera 610. The depth value grid 614 includes the example data points 616a, 616b, 616c, 618a, 618b, and 618c, as shown. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 600 includes sparse depth data 612 as a grid 614. In some implementations, the grid 614 may include more or less depth data values acquired from the depth camera 610.

Figure 7:
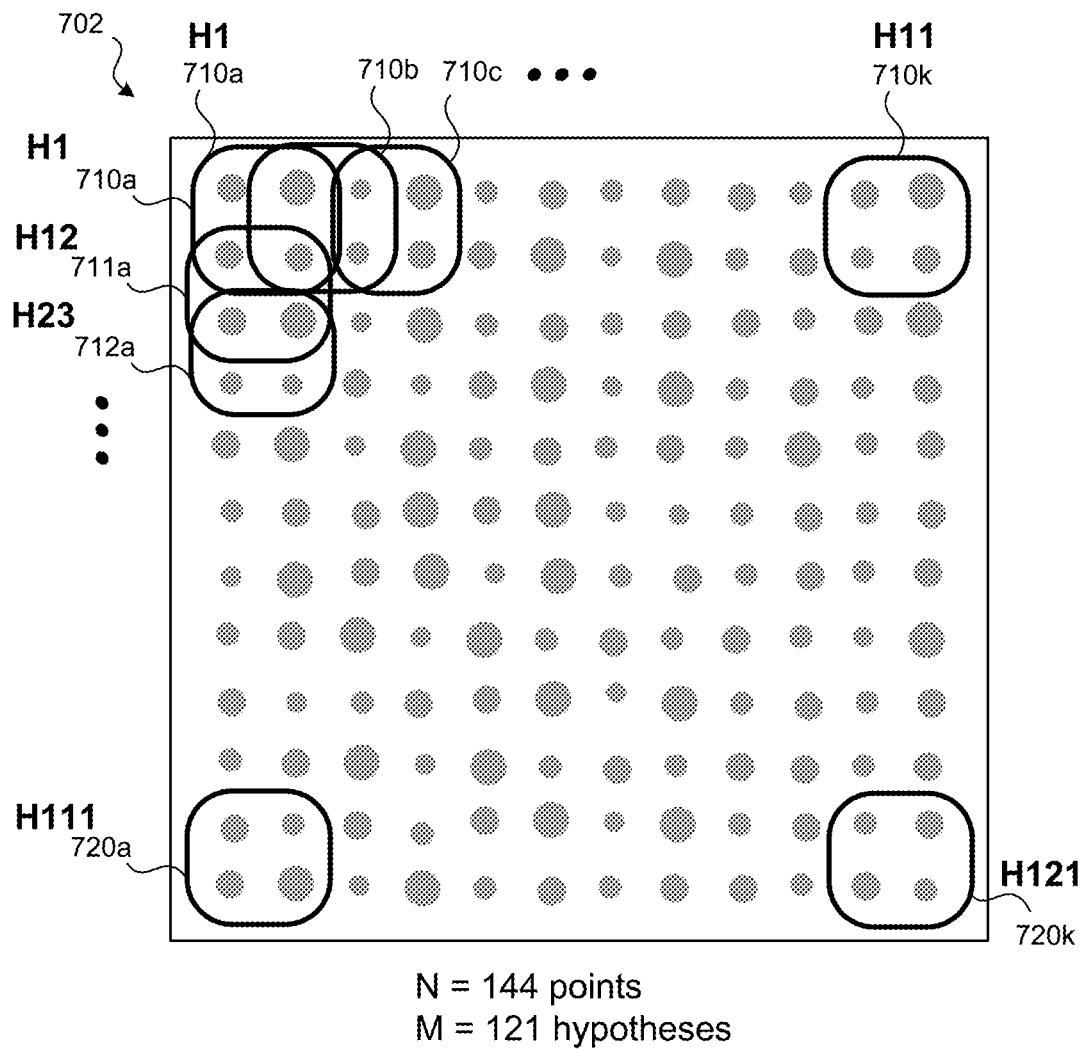
FIG. 7 is a block diagram illustrating example hypothesis determination for a plane detection algorithm in accordance with some implementations.

FIG. 7 is a block diagram illustrating example hypothesis determination for a plane detection algorithm in accordance with some implementations. In particular, FIG. 7 displays an example grid 702 of example sparse depth data (e.g., sparse depth data from the example grid 614 that includes example depth data of the chair 142). For example, grid 702 is a 12×12 grid that includes 144 points, and each point is grouped together as a group of four points that are adjacent to each other. For example, hypothesis 710a (e.g., the first hypothesis "H1") includes a group of four depth points located in the top left corner. Following that row of hypotheses to the right for each column for hypotheses 710a through 710k would include hypotheses H1 through H11. Following the column of hypotheses down from hypotheses 710a would include hypotheses 710a, 711a, 712a . . . through 720a, which would include hypotheses H1, H12, H23 . . . through H111. The final hypothesis is hypothesis 720k (e.g., hypothesis H121). The resulting grid of hypothesis for grid 702 of M×N hypotheses, is an 11×11 grid of hypotheses, or 121 unique hypothesis created for a 12×12 grid of depth values.

In some implementations, hypothesis generation may include neighboring sets of points (e.g., four in the example implementation for grid 702 whose projections on the 2D sensor images are adjacent). The neighboring sets of points are used to compute the distance, d, and normal-to-the plane vector, n, (or equivalently the bearing vector towards the plane) that these points may belong to. In particular, the normal-to-the plane vector is first computed by determining the eigenvector corresponding to the smallest eigenvalue of the covariance matrix calculated based on the set of points. Subsequently, the distance to the plane is computed as the average of the dot product of each of the points on the plane normal. In some implementations, given the relatively small number of points involved in this process, the parameters of the computed plane hypothesis (d, n) are not necessarily accurate, thus, hypotheses can be discarded if the points result in a degenerate case (e.g., form a line instead of a plane), which can be detected by requiring the two largest eigenvalues of the covariance matrix to be of comparable values. In the example implementation, given the N=144 points of input divided into rows of 12 points, and creating a hypothesis for each four neighboring points (two from each row), M=121 hypotheses are created.

FIG. 8 is a block diagram illustrating an example refining process for depth values of a detected plane in accordance with some implementations. In particular, FIG. 8 is an example 3D graph 800 of example data points that have been initially analyzed for plane-parameters according to example implementations described herein. For example, a first plane 802 is initially detected that includes a plurality of depth data values as shown. Following a refinement process described herein, the first plane 802 is refined, outlier points 806a, 806b are excluded, and a resulting refined second plane 804 remains. In some implementations, refining the plane hypotheses can be based on cohesion evaluations. For example, a plane detection process can include merging similar hypotheses and then checking the resulting planes for cohesion (e.g., spatial continuity). In some implementations, the refining the plane hypotheses can include computing the distances between all points belonging into a plane hypothesis and rejecting the points whose mean (or median) distance to all other points is larger than the mean (or median) distance across all points.

Regarding cohesion evaluations, in some implementations, clusters of points (e.g., cluster 810 and cluster 812) belong to spatially-separated planar patches and can be merged into one plane hypothesis. Additionally, or alternatively, a set of points forming a line segment and a far-away point may be combined to form a plane. These cases can be inaccurate or ill-conditioned planes that can be removed to increase accuracy of the detected data points associated with a plane. In some implementations, removing the cluster of points (e.g., cluster 810 and cluster 812) can include projecting the 3D points on the 2D plane they form, computing their convex hull, and counting amongst all 3D points the number of outliers within this convex hull. Outliers are considered the 3D points whose ray connecting the sensor with a 3D point intersects the detected plane at a point which lies within the convex hull. For example, the plane detection process can include accepting the plane if the ratio of inliers to outliers is above a ratio threshold (e.g., a ratio threshold of 50% such that at least half of the points are within the plane's convex hull). If the ratio of inliers to outliers is equal to or below the ratio threshold, the plane detection process can either discard the plane, or divide the plane into smaller planes and repeat the process (e.g., refining the plane hypothesis based on cohesion evaluations for each smaller plane). The output of the algorithm for removing the cluster of points can include setting a plane hypothesis $\pi_j$ with approximate parameters ($d_j$, $n_j$) and the set of points that belongs to each of these planes. Additionally, or alternatively, providing robust planes is also based on a ratio of the detected plane length to the detected plane width in order to determine whether the detected plane should be classified as a plane or a "wide" line strip.

Figure 9:
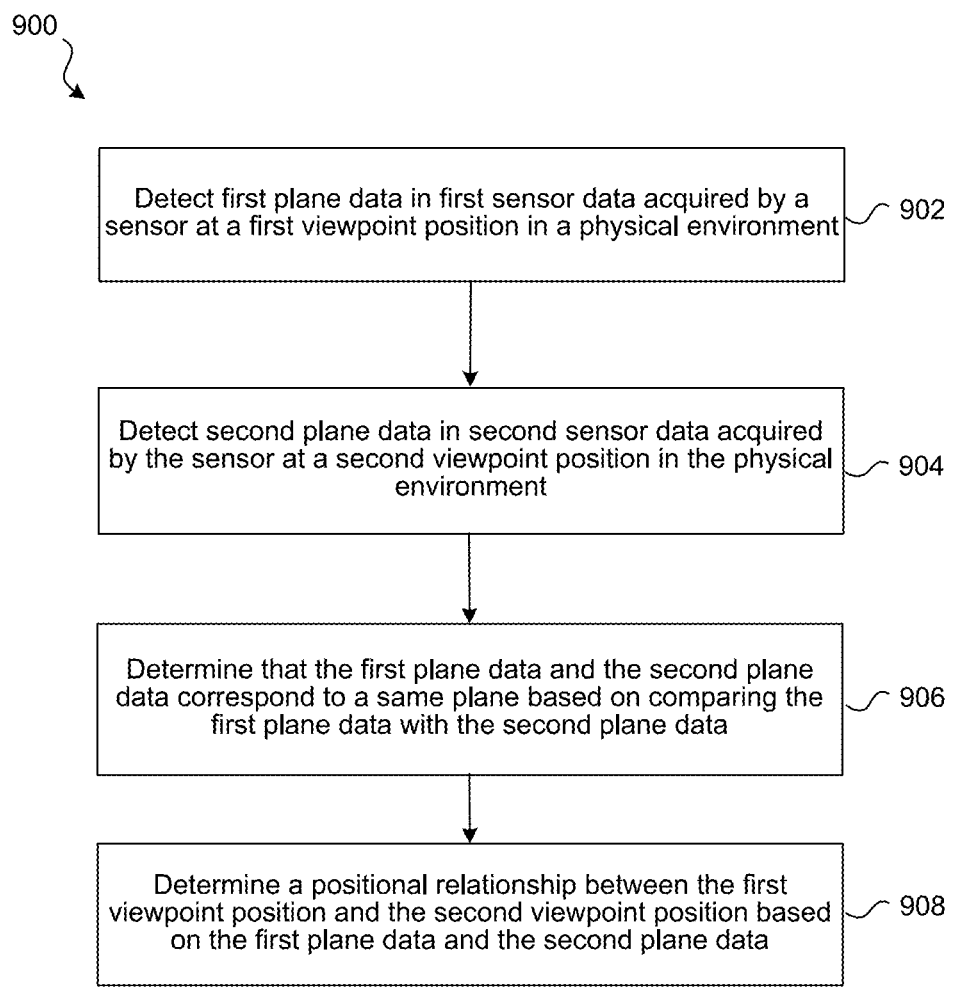
FIG. 9 is a flowchart representation of an exemplary method that localizes a device based on detecting planes in depth data acquired by the device in accordance with some implementations.

FIG. 9 is a flowchart representation of an exemplary method 900 that localizes a device based on detecting and tracking planes in depth data acquired by the device in accordance with some implementations. In some implementations, the method 900 is performed by a device (e.g., server 110 or device 120 of FIGS. 1-3), such as a mobile device, desktop, laptop, or server device. The method 900 can be performed on a device (e.g., device 120 of FIGS. 1 and 3) that has a screen for displaying images and/or a screen for viewing stereoscopic images such as a head-mounted display (HMD). In some implementations, the method 900 is performed by processing logic, including hardware, firmware, software, or a combination thereof. In some implementations, the method 900 is performed by a processor executing code stored in a non-transitory computer-readable medium (e.g., a memory). An example frame-to-frame plane matching process discussed herein with respect to method 900 is illustrated with reference to FIG. 10.

At block 902, the method 900 detects first plane data (e.g., one or more planes) in first sensor data acquired by a sensor at a first viewpoint location in a physical environment, and at block 904, the method 900 detects second plane data (e.g., one or more planes) in second sensor data acquired by the sensor at a second viewpoint location in the physical environment. For example, the sensor data may be a grid of depth values acquired at a first point in time. Additionally, plane data may include 3D positions of depth points of the sensor data on a plane, a plane normal vector of the plane, and/or a distance of the plane from the viewpoint location. In some implementations, the first sensor data and second sensor data include a grid of depth values obtained via a depth sensor. In some implementations, determining that the first plane data and the second plane data correspond to the same plane includes determining that a direction of the first plane normal vector and a direction of the second plane normal vector, when rotated based on a prior estimate of the rotation between the two frames, are within a vector direction threshold.

At block 906, the method 900 determines that the first plane data and the second plane data correspond to a same plane based on comparing the first plane data with the second plane data. For example, determining that the first plane data and the second plane data correspond to a same plane may be determined by comparing the plane data such as plane normal vectors and distances to each respective plane. In some implementations, if multiple planes are detected in each frame, the planes can be matched across the frames. In some implementations, determining that the first plane data and the second plane data correspond to the same plane further includes determining a sensor-to plane distance in the first plane data and a sensor-to-plane distance in the second plane data are within a sensor-to-plane distance threshold.

In some implementations, comparing the first plane data with the second plane data may include plane tracking processes. For example, $M_i$ planes, $\pi\hat{}i_j$, $j=1 \ldots M_i$, $i=k-N+1 \ldots k$, are extracted at each of the N previous time steps. To create plane tracks, plane-to-plane matches can be determined between pairs of depth-sensor frames. In some implementations, the depth frames do not need to be consecutive in time. In some implementations, the depth frames are particularly selected to minimize the time offset between them and the camera frames processed by the VIO (e.g., choosing depth frames and light intensity image frames that are acquired at the same time). Minimizing the time offset between depth frames and light intensity image frames reduces the interpolation errors that can incur by expressing the depth sensor's data with respect to the closest camera's frame.

In some implementations, frame-to-frame plane matching can include extrinsic calibration parameters between two sensor frames of reference (e.g., estimated online by the VIO) in order to express the detected planes of one frame to the coordinates of another. For example, the parameters $(d\hat{}k_j, n\hat{}k_j)$, $j=1 \ldots M_k$ of all the planes $\pi\hat{}k_j$ extracted in frame $\{k\}$ can be transformed and expressed in the coordinates of frame $\{k-1\}$: $(d\hat{}\{k-1\}_j, n\hat{}\{k-1\}_j)$, $j=1 \ldots M_k$ through the following equations:

$$n\hat{}\{k-1'\}_j = C\hat{}\{k-1\}_{\{k\}} n\hat{}\{k\}_j, j=1 \ldots M_k$$

$$d\hat{}\{k-1'\}_j = d\hat{}\{k\}_j - (n\hat{}\{k\}_j)^\top T^* p\hat{}\{k\}_{\{k-1\}}, j=1 \ldots M_k$$

where $C\hat{}\{k-1\}_{\{k\}}$ is the 3×3 rotational matrix rotating vectors from frame $\{k\}$ to frame $\{k-1\}$ and $p\hat{}\{k\}_{\{k-1\}}$ is the 3×1 vector denoting the position of frame $\{k-1\}$ in frame $\{k\}$. At this point, plane matches can be determined by first comparing the plane normal vectors of the planes extracted in $\{k\}$ and transformed into $\{k-1\}$ with parameters $(d\hat{}\{k-1'\}_j, n\hat{}\{k-1'\}_j)$, $j=1 \ldots M_k$ against the ones extracted in $\{k-1\}$ with parameters $(d\hat{}\{k-1\}_\xi, n\hat{}\{k-1\}_\xi)$, $\xi=1 \ldots M_{\{k-1\}}$ to see whether they are parallel. In our case, if $(n\hat{}\{k-1'\}_j{}^\top n\hat{}\{k-1\}_\xi) > 1-\varepsilon$, then we consider the two planes as parallel and classify them as candidate matches for the next step where we require their distances to be approximately the same, i.e., $abs(d\hat{}\{k-1'\}_j - d\hat{}\{k-1\}_\xi) < \varepsilon'$. In some implementations, frame-to-frame plane matches can determine a set, S, that includes pairs of matched planes, e.g., $S_{\{k,k-1\}} = \{(\pi\hat{}\{k-1\}, \pi\hat{}\{k\}_j)$ for some $j=1 \ldots M_k, \xi=1 \ldots M_{\{k-1\}}\}$. In some implementations, one plane is matched to multiple planes, where since 1-to-1 matching of planes is desirable, a match may be accepted only if the two candidates do not match with any other plane or if the two candidates are mutually the best match (e.g., among all the planes of the other frame, the one closest in terms of orientation and distance). An example frame-to-frame plane matching is illustrated with reference to FIG. 10, further discussed herein.

In some implementations, creating plane tracks can include grouping together the observations of one plane from multiple frames to a single track, e.g., given a set of plane matches $S\_\{\mu,v\}$ for $\mu,v \in \{k-N+1, \ldots, k\}$. For example, $T\_\{\pi\hat{}\{k-N+2\}_j\} = \{(d\hat{}\{k-N+1\}_j, n\hat{}\{k-N+1\}_j), (d\hat{}\{k-N+2\}_\xi, n\hat{}\{k-N+2\}_\xi), (d\hat{}\{k-1\}_\psi, n\hat{}\{k-1\}_\psi)\}$, includes the parameters of plane j that was first detected in frame $\{k-N+1\}$ and was subsequently tracked in frames $\{k-N+2\}$. Then, after a gap, plane j was redetected in frame $\{k-1\}$ (assume, e.g., N=5). In an exemplary implementation, the identification of the plane changes from j to ξ to ψ within the consecutive frames. In some implementations, the output of the process that creates the plane tracks is the set of all the possible plane tracks that can be detected within the time window of N sensor (frame) poses. These plane tracks can then be provided to a VIO algorithm for fusing them along with IMU measurements and (if any are available) camera visual observations (e.g., light intensity image data).

At block 908, the method 900 determines a spatial transformation (e.g., motion or movement of the device) between the first viewpoint location and the second viewpoint location based on the first plane data and the second plane data. For example, the plane normal vector and distance associated with the plane for each of the viewpoints may be used to determine motion constraints. In some implementations, the IMU data may be used to determine the motion of the sensor or the device. For example, corrections to the IMU integration within the estimation framework of the VIO may be utilized.

In some implementations, determining the spatial transformation of the method 900 includes determining a motion constraint based on a first plane normal vector of the first plane data and second plane normal vector of the second plane data. In some implementations, determining the spatial transformation includes determining a second motion constraint based on a sensor-to-plane distance of the first plane data and a sensor-to-plane distance of the second plane data.

In some implementations, determining the spatial transformation of the method 900 includes determining motion constraints based on a first plane normal vector of the first plane data and second plane normal vector of the second plane data, a sensor-to-plane distance of the first plane data and a sensor-to-plane distance of the second plane data, and covariance data for the plane normal vectors and the sensor-to-plane distances. In some implementations, determining the spatial transformation includes determining a motion based on motion data from IMU.

In some implementations, the method 900 further includes identifying multiple planes represented in the first sensor data and the second sensor data, and determining motion constraints based on the multiple planes, wherein determining the spatial transformation is based on the motion constraints.

In some implementations, the method 900 includes VIO processing of planes after acquiring the plane tracks. The processing of planes can include estimating the device's motion by determining potentially a sliding time-window, or an incremental time-window batch least squares (BLS) problem, where the cost terms include a state prior from the previous step (e.g., block 906), cost terms that relate to consecutive poses based on the IMU measurements, cost terms corresponding to visual feature observations (if any are available), and lastly the new cost terms corresponding to tracked planes. The VIO processing of planes can be determined based on the following equation:

$$C(x,p,\pi) = \frac{1}{2}(\|x_{\{k-N+1\}} - \hat{x}_{\{k-N+1\}}\|^2_{\{P\}} + \\ \text{Sum}_{\{k=k-N+1 \ldots k-1\}} \|x_{\{j+1\}} - f(x_j, u_j)\|^2_{\{Q\}} + \\ \text{Sum}_{\{j=k-N+1 \ldots k\}} \backslash \text{Sum}_{\{\xi=1 \ldots M_j\}} \|z\hat{\ }\{\xi\}_{\{j\}} - h \\ (x_j, p_{\{\xi\}})\|^2_{\{R\}} + \backslash \text{Sum}_{\{j=k-N+1 \ldots k\}} \backslash \\ \text{Sum}_{\{\psi=1 \ldots M_j\}} \|\zeta\hat{\ }\{\psi\}_{\{j\}} - h\_\pi(x_j, d_\psi, n_\psi)\|^2_{\{R,\pi\}})$$

where f( ), h( ), h_π( ) are the nonlinear functions describing the IMU, $u_j$, point feature, $z\hat{\ }\{\xi\}_{\{j\}}$, and plane, $\zeta\hat{\ }\{\psi\}_{\{j\}}$, measurements, respectively, Q, R, $R_\pi$, are the covariances of the noise in these measurements, $d_\psi$, $n_\psi$, are the distance and normal vector parameters of plane ψ, $p_{\{\xi\}}$ are the coordinates of point feature ξ, $\hat{x}_{\{k-N+1\}}$ is the prior estimate for state $x_{\{k-N+1\}}$, and P is the covariance expressing the uncertainty in this prior. Each plane's parameters are expressed with respect to the coordinate system {k} of the corresponding sensor frame. In one example implementation, an auxiliary coordinate system can be defined, e.g., {k'}, whose axes are parallel to those of {k}, and origin is a point along the plane's normal vector originating at the points' center (e.g., computed as the mean of their coordinates), and at distance d. This example alternative parameterization allows expressing the covariance of the plane's parameters as a diagonal matrix and improves overall numerical accuracy.

In some implementations, the cost function defined in the VIO processing of planes equation can be minimized by first processing the cost terms corresponding to the plane measurements to create motion constraints between the sensors' frames. In some implementations, creating motion constraints between the sensors' frames is determined by each plane track being processed separately to create motion constraints amongst all sensor poses (up to N) involved.

Additionally, or alternatively, in some implementations, creating motion constraints between the sensors' frames is determined by pairs of matched planes being processed independently to create constraints between the sensor frames involving the two planes. The constraints can be determined by considering the difference in the parameters (e.g., distance and normal vector) of a plane when transforming its coordinates from, e.g., frame {k} to frame {k−1} and comparing them to the corresponding parameters of the matched plane of frame {k−1}. Alternatively, the reprojection error of the 3D points forming the plane extracted in, e.g., frame {k} can be transformed to the coordinates of frame {k−1}.

In some implementations, once the constraints between the sensor frames have been defined, the defined sensor frames can be fused with the camera and IMU measurements by processing the visual point feature observations after linearizing the measurement functions f( ), h( ), and $h_\pi$( ) about the current estimates for all the states, point features, and planes, where the cost function C(x,p,π) becomes a quadratic in the error states. In some implementations, derivatives can be determined with respect to the estimated error states and form the normal equations to determine the corresponding Hessian. In some implementations, the Schur complement, or equivalent methods, can be utilized to marginalize all point features and planes, and then solve for the error state.

In some implementations, the method 900 includes a camera-to-depth-sensor extrinsics calibration process. The camera-to-depth-sensor extrinsics calibration process is utilized to improve the accuracy of the estimated relative position and orientation between the camera and the depth sensor. Although the relative position and orientation between the camera and the depth sensor are assumed fixed and known (e.g., from prior calibration), the camera-to-depth-sensor extrinsics calibration process can be utilized for recalibration and increased accuracy, as well as make the VIO algorithm more robust to changes in these parameters due to thermal expansion of the frame on which these are attached.

In some implementations, the method 900 includes a camera-to-depth-sensor time-offset estimation process. Although the camera and depth sensor data are time-stamped according to the same clock and their frequencies are almost constant, the camera-to-depth-sensor time-offset estimation process is utilized to robustify the system against inaccuracies in the time-stamping process or jitter in the sensor's recording frequencies.

In use, for the process 900, a user may scan a room or an object within the room with a device (e.g., a smartphone such as device 120) and the processes described herein would acquire plane-parameter data, and track a location of the device in a 3D coordinate system based on estimates of the detected planes as the device moves in the physical environment. In some implementations, the process 900 could be used assist localization data in order to provide a 3D representation for the physical environment (e.g. physical environment 105), or a particular portion of the physical environment such as an object (e.g., object 130), as it is being scanned by the user. In some implementations, the 3D representation may be automatically displayed and updated on the user device overlaid during a live camera feed. In some implementations, the 3D representation may be provided after some type of user interaction after scanning the physical environment because additional image data may be required for sufficient localization and/or 3D reconstruction. For example, the user may be shown some type of augmented reality image overlaid on the live camera feed that guides the user to where to acquire the additional data.

Figure 10:
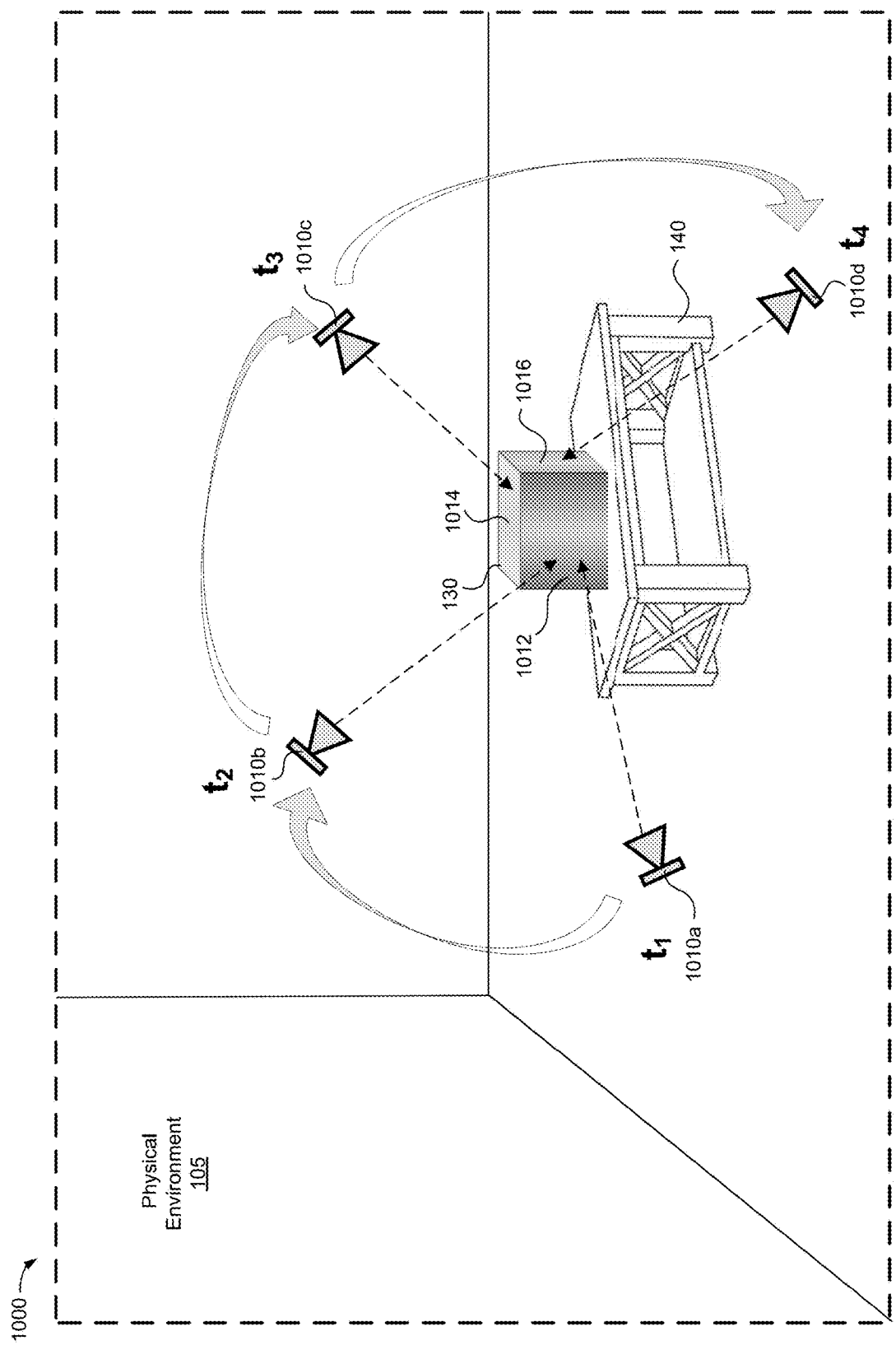
FIG. 10 is a block diagram illustrating example views of a camera of a device with respect to detected planes of an object in a physical environment in accordance with some implementations.

FIG. 10 is a block diagram of an example operating environment 1000 illustrating example camera positions of a camera on a device (e.g., image sensor systems 314 of the device 120) with respect to an object (e.g., object 130) in a physical environment in accordance with some implementations. In particular, example operating environment 1000 illustrates an example frame-to-frame plane matching technique in accordance with some implementations described herein. In this example, the example operating environment 1000 illustrates an environment that includes a device 1010 (e.g., image sensor systems 314 of the device 120), an object 130, and a table 140 from the physical environment 105 of FIG. 1. The device 1010 is shown at four different camera views, device 1010a-1010d, each with a different field of view and perspective relative to the object 130, for four different camera frames at times $t_1$, $t_2$, $t_3$, and $t_4$. These example camera views are for illustrative purposes only. While pertinent features are shown, those of ordinary skill in the art will appreciate from the present disclosure that various other features have not been illustrated for the sake of brevity and so as not to obscure more pertinent aspects of the example implementations disclosed herein. For example, frame-to-frame matching may more likely occur at frames that are much closer in time and distance with respect to a target object. To that end, as a non-limiting example, the operating environment 1000 includes four different views of planes with respect to the object 130. Device 1010a and device 1010b are viewing multiple sides of the object 130, but the center focus is on plane 1012 (e.g., a front side), device 1010c is center focused on the plane 1014 (e.g., a top side), and device 1010d is center focused on plane 1016 (e.g., a right side of the object from the current perspective view of FIG. 10). Although only four different camera views are illustrated, it can be assumed that there several more images (e.g., light intensity images and depth data) acquired at any point in time as the user walks around the object 130 and scans the object 130.

As discussed herein, frame-to-frame plane matching can include extrinsic calibration parameters between two sensor frames of reference (e.g., estimated online by the VIO) in order to express the detected planes of one frame to the coordinates of another. For example, a comparison can be made between the data acquired by device 1010a at time $t_1$ and device 1010b at time $t_2$. with respect to the detected plane data for plane 1012. Plane matches can be determined by first comparing the plane normal vectors of the planes extracted at a first frame for time $t_1$ against the parameters extracted at a second frame for time $t_2$ to see whether they are parallel. If the two planes are determined to be parallel, they are classified as candidate matches. Then distances are compared. In some implementations, frame-to-frame plane matches can determine a set, S, that includes pairs of matched planes. In some implementations, one plane is matched to multiple planes, where since 1-to-1 matching of planes is required, a match may be accepted only if the two candidates do not match with any other plane or if the two candidates are mutually the best match (e.g., among all the planes of the other frame, the one closest in terms of orientation and distance).

In some implementations, the image composition pipeline may include virtual content (e.g., a virtual box placed on the table 135 in FIG. 1) that is generated for an extended reality (XR) environment. In some implementations, the operating systems 230, 330 includes built in XR functionality, for example, including a XR environment application or viewer that is configured to be called from the one or more applications 240, 340 to display a XR environment within a user interface. For example, the systems described herein may include a XR unit that is configured with instructions executable by a processor to provide a XR environment that includes depictions of a physical environment including real physical objects and virtual content. A XR unit can generate virtual depth data (e.g., depth images of virtual content) and virtual intensity data (e.g., light intensity images (e.g., RGB) of the virtual content). For example, one of the applications 240 for the server 110 or applications 340 for the device 120 could include a XR unit that is configured with instructions executable by a processor to provide a XR environment that includes depictions of a physical environment including real objects or virtual objects. The virtual objects may be positioned based on the detection, tracking, and representing of objects in 3D space relative to one another based on stored 3D models of the real objects and the virtual objects, for example, using one or more of the techniques disclosed herein.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device having a processor and one or more sensors:
   obtaining sensor data acquired by the one or more sensors, wherein at least one of the one or more sensors comprises a depth camera or a light intensity image camera from which the device is configured to obtain information about surfaces within an environment;
   determining a first location of the device in a three-dimensional (3D) coordinate system of a physical environment for a first period of time based on motion data that is determined based on depth data, wherein the depth data is determined based on the sensor data acquired by the depth camera or the light intensity image camera;
   estimating a first plane parameter of a first plane based on first plane data detected in a first set of sensor data acquired by the one or more sensors at a first viewpoint location in a physical environment, the first plane parameter estimated based on classifying a first set of 3D points of the first plane data into planes and estimating the first plane parameter based on the first set of 3D points, wherein the first plane parameter corresponds to 3D position or 3D orientation of the first plane;
   estimating a second plane parameter of a second plane based on detecting second plane data in a second set of sensor data acquired by the one or more sensors at a second viewpoint location in the physical environment, the second plane parameter estimated based on classifying a second set of 3D points of the second plane data into planes and estimating the second plane parameter based on the second set of 3D points, wherein the second plane parameter corresponds to 3D position or 3D orientation of the second plane, and wherein the second viewpoint location is different than the first viewpoint location;
   determining that the first plane and the second plane correspond to a same plane based on comparing the first plane parameter and the second plane parameter;
   determining a spatial transformation between the first viewpoint location and the second viewpoint location based on determining that the first plane and the second plane correspond to the same plane;
   determining localization data for tracking the location of the device in the 3D coordinate system based on: i) the motion data, ii) the spatial transformation between the first viewpoint location and the second viewpoint location, and iii) a distance from the device to the determined same plane; and
   determining a second location of the device in the 3D coordinate system of the physical environment for a second period of time based on the localization data.

2. The method of claim 1, wherein determining the spatial transformation comprises determining a motion constraint based on a first plane normal vector of the first plane data and second plane normal vector of the second plane data.

3. The method of claim 1, wherein determining the spatial transformation comprises determining a second motion constraint based on a sensor-to-plane distance of the first plane data and a sensor-to-plane distance of the second plane data.

4. The method of claim 1, wherein determining the spatial transformation comprises determining motion constraints based on:
   a first plane normal vector of the first plane data and second plane normal vector of the second plane data;
   a sensor-to-plane distance of the first plane data and a sensor-to-plane distance of the second plane data; and
   covariance data of the plane normal vectors and the sensor-to-plane distances.

5. The method of claim 1, wherein determining the spatial transformation comprises determining a motion based on motion data from an inertial measurement unit (IMU).

6. The method of claim 1, wherein the sensor is a depth sensor, and wherein the first sensor data and second sensor data comprise a grid of depth values obtained via the depth sensor.

7. The method of claim 1, wherein determining that the first plane and the second plane correspond to the same plane comprises determining that a direction of a first plane normal vector of the first plane data and a direction of a second plane normal vector of the second plane data are within a normal vector angle threshold.

8. The method of claim 7, wherein determining that the first plane and the second plane correspond to the same plane further comprises determining a sensor-to plane distance in the first plane data and a sensor-to-plane distance in the second plane data are within a sensor-to-plane distance threshold.

9. The method of claim 1, further comprising
identifying multiple planes represented in the first sensor data and the second sensor data; and
determining motion constraints based on the multiple planes,
wherein determining the spatial transformation is based on the motion constraints.

10. A device comprising:
one or more sensors;
a non-transitory computer-readable storage medium; and
one or more processors coupled to the non-transitory computer-readable storage medium, wherein the non-transitory computer-readable storage medium comprises program instructions that, when executed on the one or more processors, cause the device to perform operations comprising:
obtaining sensor data acquired by the one or more sensors, wherein at least one of the one or more sensors comprises a depth camera or a light intensity image camera from which the device is configured to obtain information about surfaces within an environment;
determining a first location of the device in a three-dimensional (3D) coordinate system of a physical environment for a first period of time based on motion data that is determined based on depth data, wherein the depth data is determined based on the sensor data acquired by the depth camera or the light intensity image camera;
estimating a first plane parameter of a first plane based on first plane data detected in a first set of sensor data acquired by the one or more sensors at a first viewpoint location in a physical environment, the first plane parameter estimated based on classifying a first set of 3D points of the first plane data into planes and estimating the first plane parameter based on the first set of 3D points, wherein the first plane parameter corresponds to 3D position or 3D orientation of the first plane;
estimating a second plane parameter of a second plane based on detecting second plane data in a second set of sensor data acquired by the one or more sensors at a second viewpoint location in the physical environment, the second plane parameter estimated based on classifying a second set of 3D points of the second plane data into planes and estimating the second plane parameter based on the second set of 3D points, wherein the second plane parameter corresponds to 3D position or 3D orientation of the second plane, and wherein the second viewpoint location is different than the first viewpoint location;
determining that the first plane and the second plane correspond to a same plane based on comparing the first plane parameter and the second plane parameter;
determining a spatial transformation between the first viewpoint location and the second viewpoint location based on determining that the first plane and the second plane correspond to the same plane;
determining localization data for tracking the location of the device in the 3D coordinate system based on: i) the motion data, ii) the spatial transformation between the first viewpoint location and the second viewpoint location, and iii) a distance from the device to the determined same plane; and
determining a second location of the device in the 3D coordinate system of the physical environment for a second period of time based on the localization data.

11. The device of claim 10, wherein determining the spatial transformation comprises determining a motion constraint based on a first plane normal vector of the first plane data and second plane normal vector of the second plane data.

12. The device of claim 10, wherein determining the spatial transformation comprises determining a second motion constraint based on a sensor-to-plane distance of the first plane data and a sensor-to-plane distance of the second plane data.

13. The device of claim 10, wherein determining the spatial transformation comprises determining motion constraints based on:
a first plane normal vector of the first plane data and second plane normal vector of the second plane data;
a sensor-to-plane distance of the first plane data and a sensor-to-plane distance of the second plane data; and
covariance data of the plane normal vectors and the sensor-to-plane distances.

14. The device of claim 10, wherein determining the spatial transformation comprises determining a motion based on motion data from an inertial measurement unit (IMU).

15. The device of claim 10, wherein the first sensor data and second sensor data comprise a grid of depth values obtained via a depth sensor.

16. The device of claim 10, wherein determining that the first plane and the second plane correspond to the same plane comprises:
determining that a direction of a first plane normal vector of the first plane data and a direction of a second plane normal vector of the second plane data are within a normal vector angle threshold; and
determining a sensor-to plane distance in the first plane data and a sensor-to-plane distance in the second plane data are within a sensor-to-plane distance threshold.

17. The device of claim 10, wherein the operations further comprise:
identifying multiple planes represented in the first sensor data and the second sensor data; and
determining motion constraints based on the multiple planes,
wherein determining the spatial transformation is based on the motion constraints.

18. A non-transitory computer-readable storage medium, storing computer-executable program instructions on a device to perform operations comprising:
obtaining sensor data acquired by one or more sensors at the device, wherein at least one of the one or more sensors comprises a depth camera or a light intensity image camera from which the device is configured to obtain information about surfaces within an environment;
determining a first location of the device in a three-dimensional (3D) coordinate system of a physical environment for a first period of time based on motion data that is determined based on depth data, wherein the depth data is determined based on the sensor data acquired by the depth camera or the light intensity image camera;

estimating a first plane parameter of a first plane based on first plane data detected in a first set of sensor data acquired by the one or more sensors at a first viewpoint location in a physical environment, the first plane parameter estimated based on classifying a first set of 3D points of the first plane data into planes and estimating the first plane parameter based on the first set of 3D points, wherein the first plane parameter corresponds to 3D position or 3D orientation of the first plane;

estimating a second plane parameter of a second plane based on detecting second plane data in a second set of sensor data acquired by the one or more sensors at a second viewpoint location in the physical environment, the second plane parameter estimated based on classifying a second set of 3D points of the second plane data into planes and estimating the second plane parameter based on the second set of 3D points, wherein the second plane parameter corresponds to 3D position or 3D orientation of the second plane, and wherein the second viewpoint location is different than the first viewpoint location;

determining that the first plane and the second plane correspond to a same plane based on comparing the first plane parameter and the second plane parameter;

determining a spatial transformation between the first viewpoint location and the second viewpoint location based on determining that the first plane and the second plane correspond to the same plane;

determining localization data for tracking the location of the device in the 3D coordinate system based on: i) the motion data, ii) the spatial transformation between the first viewpoint location and the second viewpoint location, and iii) a distance from the device to the determined same plane; and determining a second location of the device in the 3D coordinate system of the Physical environment for a second period of time based on the localization data.

19. The non-transitory computer-readable storage medium of claim 18, wherein determining the spatial transformation comprises:
   determining a motion constraint based on a first plane normal vector of the first plane data and second plane normal vector of the second plane data; or
   determining a second motion constraint based on a sensor-to-plane distance of the first plane data and a sensor-to-plane distance of the second plane data.

20. The non-transitory computer-readable storage medium of claim 18, wherein determining the spatial transformation comprises determining motion constraints based on:
   a first plane normal vector of the first plane data and second plane normal vector of the second plane data;
   a sensor-to-plane distance of the first plane data and a sensor-to-plane distance of the second plane data; and
   covariance data of the plane normal vectors and the sensor-to-plane distances.

21. The method of claim 1, wherein the second location is different than the first location in the 3D coordinate system of the physical environment.

* * * * *